(12) United States Patent
Linares-Barranco et al.

(10) Patent No.: US 11,301,753 B2
(45) Date of Patent: Apr. 12, 2022

(54) NEURON CIRCUIT, SYSTEM, AND METHOD WITH SYNAPSE WEIGHT LEARNING

(71) Applicants: Samsung Electronics Co., Ltd., Suwon-si (KR); Consejo Superior de Investigaciones Cientificas, Madrid (ES)

(72) Inventors: Bernabe Linares-Barranco, Seville (ES); Amirreza Yousefzadeh, Eindhoven (NL); Evangelos Stromatias, Amsterdam (NL); Teresa Serrano-Gotarredona, Seville (ES)

(73) Assignees: Samsung Electronics Co., Ltd., Suwon-si (KR); CONSEJO SUPERIOR DE INVESTIGACIONES CIENTIFICAS, Madrid (ES)

(*) Notice: Subject to any disclaimer, the term of this patent is extended or adjusted under 35 U.S.C. 154(b) by 408 days.

(21) Appl. No.: 16/181,850

(22) Filed: Nov. 6, 2018

(65) Prior Publication Data

US 2019/0138900 A1    May 9, 2019

Related U.S. Application Data

(60) Provisional application No. 62/581,957, filed on Nov. 6, 2017.

(30) Foreign Application Priority Data

Jun. 18, 2018  (KR) .......................... 10-2018-0069625

(51) Int. Cl.
  *G06N 3/08*  (2006.01)
  *G06N 3/063*  (2006.01)
  *G06N 7/00*  (2006.01)

(52) U.S. Cl.
  CPC .............. *G06N 3/08* (2013.01); *G06N 3/063* (2013.01); *G06N 7/005* (2013.01)

(58) Field of Classification Search
  CPC .......... G06N 3/08; G06N 7/005; G06N 3/063; G06N 3/049
  See application file for complete search history.

(56) References Cited

U.S. PATENT DOCUMENTS 8,473,439 B2 * 6/2013 Arthur ................... G06N 3/049
                                                    706/35
9,021,172 B2 * 4/2015 Horsnell ............. G06F 11/3409
                                                    710/262

(Continued)

FOREIGN PATENT DOCUMENTS

JP            5155843 B2     3/2013
KR    10-2016-0138002 A    12/2016

OTHER PUBLICATIONS

M. Suri et al., "Bio-Inspired Stochastic Computing Using Binary CBRAM Synapses," in IEEE Transactions on Electron Devices, vol. 60, No. 7, pp. 2402-2409, Jul. 2013, doi: 10.1109/TED.2013. 2263000. (Year: 2013).*

(Continued)

*Primary Examiner* — Kakali Chaki
*Assistant Examiner* — Johnathan R Germick
(74) *Attorney, Agent, or Firm* — NSIP Law

(57) ABSTRACT

A neuron circuit performing synapse learning on weight values includes a first sub-circuit, a second sub-circuit, and a third sub-circuit. The first sub-circuit is configured to receive an input signal from a pre-synaptic neuron circuit and determine whether the received input signal is an active signal having an active synapse value. The second sub-circuit is configured to compare a first cumulative reception counter of active input signals with a learning threshold value based on results of the determination. The third (Continued)

sub-circuit is configured to perform a potentiating learning process based on a first probability value to set a synaptic weight value of at least one previously received input signal to an active value, upon the first cumulative reception counter reaching the learning threshold value, and perform a depressing learning process based on a second probability value to set each of the synaptic weight values to an inactive value.

21 Claims, 18 Drawing Sheets

(56) References Cited

U.S. PATENT DOCUMENTS

| | | | |
|---|---|---|---|
| 9,111,222 B2 | 8/2015 | Aparin | |
| 9,208,434 B2 * | 12/2015 | Suri | G06N 3/08 |
| 9,269,042 B2 * | 2/2016 | Friedman | G06N 3/049 |
| 9,489,622 B2 | 11/2016 | Modha | |
| 2014/0351186 A1 * | 11/2014 | Julian | G06N 3/088 706/20 |
| 2015/0278680 A1 | 10/2015 | Annapureddy et al. | |
| 2016/0364643 A1 * | 12/2016 | Cruz-Albrecht | G06N 3/063 |
| 2017/0213129 A1 | 7/2017 | Lee | |
| 2018/0089557 A1 * | 3/2018 | Kumar | G06N 3/088 |
| 2018/0276348 A1 * | 9/2018 | Jamison | G16C 20/70 |
| 2019/0286944 A1 * | 9/2019 | Thorpe | G06K 9/6257 |

OTHER PUBLICATIONS

Eckhorn, Reitboeck, Arndt and Dicke, "Feature linking via stimulus-evoked oscillations: experimental results from cat visual cortex and functional implications from a network model," International 1989 Joint Conference on Neural Networks, Washington, DC, USA, 1989, pp. 723-730 vol. 1 (Year: 1989).*

Senn W, Fusi S. Convergence of stochastic learning in perceptrons with binary synapses. Phys Rev E Stat Nonlin Soft Matter Phys. Jun. 2005;71(6 Pt 1):061907. doi: 10.1103/PhysRevE.71.061907. Epub Jun. 16, 2005. PMID: 16089765. (Year: 2005).*

Srinivasan, G., Sengupta, A. & Roy, K. Magnetic Tunnel Junction Based Long-Term Short-Term Stochastic Synapse for a Spiking Neural Network with On-Chip STDP Learning. Sci Rep 6, 29545 (2016). https://doi.org/10.1038/srep29545 (Year: 2016).*

T. Masquelier et al., "Spike Timing Dependent Plasticity Finds the Start of Repeating Patterns in Continuous Spike Trains", *PLoS ONE*, vol. 3 No. 1, Jan. 2008, p. 1-9 (9 pages in English).

T. Masquelier et al., "Competitive STDP-Based Spike Pattern Learning", *Neural computation* vol. 21 No. May 5, 2009, p. 1259-1276 (19 pages in English).

L. Camunas-Mesa et al., "An Event-Driven Multi-Kernel Convolution Processor Module for Event-Driven Vision Sensors", *IEEE Journals of Solid-State Circuits*, vol. 4, No. 2, Feb. 2012, p. 504-517 (14 pages in English).

M. Courbariaux et al., "Binaryconnect: Training Deep Neural Networks with Binary Weights During Propagations", *Proceedings of the Advances in neural information processing systems*, Dec. 2015, p. 1-9 (9 pages in English).

A. Yousefzadeh et al., "Hardware Implementation of Convolutional STDP for On-line Visual Feature Learning" *Proceedings of the IEEE International Symposium on Circuits and Systems*, May 2017, p. 1-4 (4 pages in English).

J. Seo et al., "a 45nm CMOS Neuromorphic Chip with a Scalable Architecture for Learning in Networks of Spiking Neurons", *Proceedings of the IEEE Custom Integrated Circuits Conference (CICC)*, Sep. 2011 (4 pages in English).

M. Suri et al., "Bio-Inspired Stochastic Computing Using Binary CBRAM Synapses" *IEEE Transactions on Electron Devices*, Jul. 2013, vol. 60 No. 7, p. 2402-2409 (8 pages in English).

E. Stromatias et al., "Method and Apparatus for Stochastic STDP with Binary Weights" *Instituto de Microelectronica de Sevilla*, 2018 p. 1-13 (13 pages in English).

* cited by examiner

NEURON CIRCUIT, SYSTEM, AND METHOD WITH SYNAPSE WEIGHT LEARNING

CROSS-REFERENCE TO RELATED APPLICATION

This application claims the benefit of U.S. Provisional Application No. 62/581,957, filed on Nov. 6, 2017, in the United States Patent and Trademark Office, and Korean Patent Application No. 10-2018-0069625, filed on Jun. 18, 2018, in the Korean Intellectual Property Office the disclosure of which is incorporated herein in its entirety by reference.

BACKGROUND

1. Field

The present disclosure relates to a neuron circuit, system, and method with synapse weight learning.

2. Description of the Related Art

An artificial neural network refers to a computing device or the like in which artificial neurons or artificial neuron models are connected to one other.

Also, techniques such as a convolution neural network and a recursive neural network have been proposed as artificial neural network approaches. Moreover, a spiking neural network (SNN) approach has been proposed.

Unlike existing methods, the SNN may have a structure optimized for learning dynamic features, and combinational hardware and software methods and hardware only methods have been proposed to implement such SNNs.

However, the existing methods require excessive amounts of calculations, thereby limiting the speed at which learning can be mimicked and, thus, accumulatively decreasing the speed at which learning can be mimicked in a higher layer. In addition, since the existing methods adopt an existing deterministic method, a relatively large amount of memory is required for storing synaptic weight values, which highly increases the costs for implementing systems based on these methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neuron circuit performing synapse learning on a plurality of synaptic weight values includes a first sub-circuit, a second sub-circuit, and a third sub-circuit. The first sub-circuit is configured to receive an input signal from a pre-synaptic neuron circuit and determine whether the received input signal is an active signal having an active synapse value. The second sub-circuit is configured to compare a first cumulative reception counter of active input signals with a learning threshold value based on results of the determination. The third sub-circuit is configured to perform a potentiating learning process based on a first probability value to set a synaptic weight value of at least one previously received input signal to an active value, upon the first cumulative reception counter reaching the learning threshold value, and perform a depressing learning process based on a second probability value to set each of the plurality of synaptic weight values to an inactive value.

The neuron circuit may further include a fourth sub-circuit configured to compare a second cumulative reception counter of the active input signals with a firing threshold value based on the results of the determination. Upon the second cumulative reception counter reaching the firing threshold value, the fourth sub-circuit transmits a spike signal to a post-synaptic neuron circuit of the neuron circuit.

A synaptic weight memory may be configured to store the plurality of synaptic weight values.

The third sub-circuit may be configured to determine the second probability value based on a number of active synapses having active synaptic weight values in the synaptic weight memory as a result of the potentiating learning process.

The second sub-circuit may include a learning counter configured to count the first cumulative reception counter, the learning counter being reset upon the first cumulative reception counter reaching the learning threshold value.

The second sub-circuit may further include a learning threshold counter configured to count the learning threshold value, the learning threshold value being increased upon the first cumulative reception counter reaching the learning threshold value.

The fourth sub-circuit may include a firing counter configured to count the second cumulative reception counter, the firing counter being reset upon the second cumulative reception counter reaching the firing threshold value.

The third sub-circuit may include a random constant generator, and upon a positive random constant acquired from the random constant generator being equal to or less than a potentiating learning reference constant calculated by multiplying an upper limit of the positive random constant by the first probability value, the third sub-circuit performs the potentiating learning process.

When the positive random constant acquired from the random constant generator is equal to or greater than a depressing leaning reference constant calculated by multiplying the upper limit of the positive random constant by the second probability value, the third sub-circuit may perform the depressing leaning process on each of the plurality of synaptic weight values in the synaptic weight memory.

The third sub-circuit may include an input event buffer storing synapse information contained in received input signals, and the third sub-circuit may be configured to perform the potentiating learning process on synaptic weight values respectively corresponding to a preset number of pieces of the synapse information stored in the input event buffer in a reverse order to an order in which the pieces of synapse information are stored.

In another general aspect, a learning system for a plurality of synaptic weight values includes a learning circuit and a neuron circuit. The neuron circuit is configured to receive an input signal from a pre-synaptic neuron circuit and determine whether the received input signal is an active signal having an active synapse value, and upon a first cumulative reception counter of active input signals reaching a learning threshold value, the neuron circuit transmitting a learning request signal to the learning circuit. As the learning circuit receives the learning request signal, the learning circuit performs a potentiating learning process based on a first probability value to set a synaptic weight value of at least one input signal previously received by the neuron circuit to an active value, and the learning circuit performs a depressing learning process based on a second probability value to set each of the plurality of synaptic weight values to an inactive value.

In another general aspect, a learning method for a neuron circuit to learn a plurality of synaptic weight values between the neuron circuit and a pre-synaptic neuron circuit, the learning method includes: as an input signal is received from the pre-synaptic neuron circuit, determining whether the received input signal is an active signal having an active synapse value; comparing a first cumulative reception counter of active input signals with a learning threshold value based on results of the determination; when the first cumulative reception counter reaches the learning threshold value, performing a potentiating learning process based on a first probability value to set a synaptic weight value of at least one previously received input signal to an active value; and performing a depressing learning process based on a second probability value to set each of the plurality of synaptic weight values to an inactive value.

The learning method may further include: comparing a second cumulative reception counter of active input signals with a firing threshold value based on results of the determination; and when the second cumulative reception counter reaches the firing threshold value, transmitting a spike signal to a post-synaptic neuron circuit of the neuron circuit.

The depressing learning process may include determining a number of active synapses having active synaptic weight values among a plurality of synapses as a result of the potentiating learning process, and determining the second probability value based on the determined number of active synapses.

The learning method may further include: initializing the first cumulative reception counter when the first cumulative reception counter reaches the learning threshold value.

The learning method may further include: increasing the learning threshold value when the first cumulative reception counter reaches the learning threshold value.

The learning method may further include: initializing the second cumulative reception counter when the second cumulative reception counter reaches the firing threshold value.

The potentiating learning process may include acquiring a positive random constant and performing the potentiating learning process when the acquired random constant is equal to or less than a potentiating learning reference constant calculated by multiplying an upper limit of the random constant by the first probability value.

The potentiating learning process may include acquiring a positive random constant for each of the plurality of synaptic weight values and performing the potentiating learning process on each of the plurality of synaptic weight values when the acquired random constant is equal to or greater than a depressing learning reference constant calculated by multiplying an upper limit of the random constant by the second probability value.

The learning method may further include storing synapse information contained in received input signals, wherein the potentiating learning process comprises performing a potentiating learning process on synaptic weight values respectively corresponding to a preset number of pieces of previously stored synapse information in reverse order to an order in which the pieces of synapse information are stored.

A computer-readable recording medium may store a program for performing the learning method using a computer.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1A:
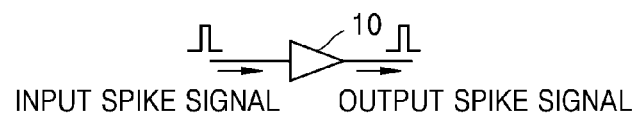
FIGS. 1A to 1C are views schematically illustrating examples of a spiking neural network (SNN).
Figure 1B:
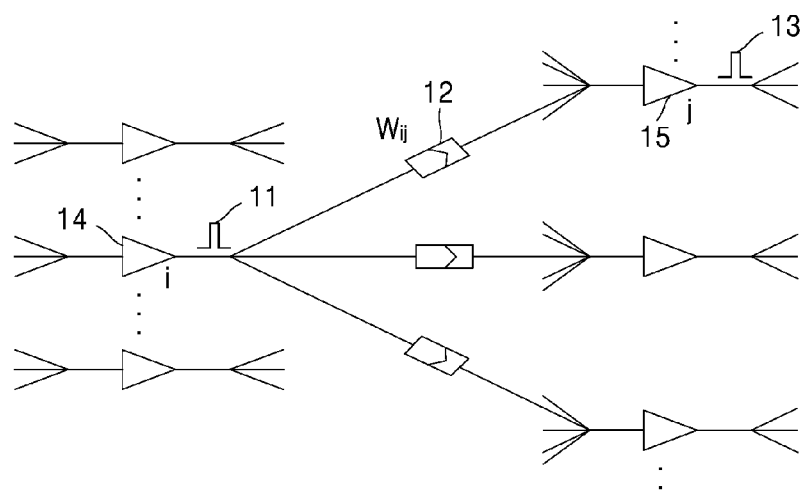
Figure 1C:
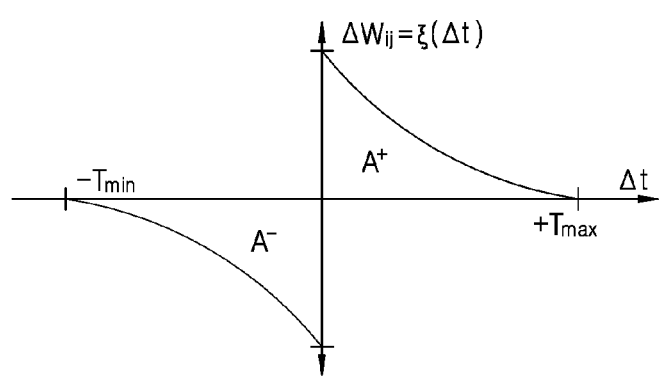

FIGS. 1A to 1C are views schematically illustrating examples of a spiking neural network (SNN).

The SNN is an artificial neural network that computationally attempts to accomplish trained objectives by implementing a neural network mechanism using neurons. The neurons may also be referred to as artificial neurons though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network, e.g., implemented through a combination of hardware and instructions or implemented through hardware only approaches. For example, the SNN may operate based on discrete spike signal(s). Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1A, a neuron 10 includes an input terminal through which an input spike signal is input. The input spike signal may have different characteristics and shapes according to physical or computational implementing methods. When the SNN is implemented purely by a computational method into, for example, a software program, the input spike signal may be expressed as information about the time at which the input spike signal is received. Alternatively, the input spike signal may be expressed as a complex neural spike signal varying with time and having varying shapes. For example, the neural spike signal may have a shape that is analogous to biological signals, as well as other varying shapes in varying examples. When the spike receipt or generation of neuron 10 is implemented through hardware, the input spike signal may be a pulse signal such as a current, voltage, charge, or magnetic pulse signal, or may be a more complicated delicate time-dependent signal. In general, a neuron may have at least one internal state variable $x_i$. In this case, i may refer to an index integer allocated to each neuron.

The input spike signal may increase or decrease the state variable $x_i$, and the former is referred to as a positive contribution degree and the latter is referred to as a negative contribution degree. This is referred to as a neuron integrating a received input spike signal. In addition, based on an implemented leakage mechanism, the state variable $x_i$ of the neuron may tend to converge to a rest state value while a spike signal is input. According to the leakage mechanism, the neuron reaches a rest state when the neuron does not receive a spike signal for a sufficiently long period of time.

FIG. 1B is a view illustrating an example of connections between neurons.

Herein, such artificial neurons are connected to one other through computational or hardware connections or links, also referred to as artificial synapses. Each such synapse is unidirectional. That is, signals are transmitted in a direction from a pre-synaptic terminal toward a post-synaptic terminal. The synapse adjusts the amount of influence of a spike signal output from a pre-synaptic neuron, which is a signal transmitting neuron transmitting the spike signal in the direction of a current neuron, on a spike signal output by the current neuron and input to a post-synaptic neuron. Herein, while such aforementioned computational or hardware connections or links will be referred to as synapses, such references are not intended to impart any relatedness with respect to how the neural network architecture computationally maps or thereby intuitively recognizes information and how a human's synapses operate, i.e., the term synapse or synaptic weight is merely a term of art referring to the computational or hardware implemented connections or links of the neural network, e.g., implemented through a combination of hardware and instructions or implemented through hardware only approaches.

In general, the degree of adjustment is determined by a synaptic weight $w_{ij}$. The synaptic weight $w_{ij}$ is expressed using a combination of an index "i" indicating a pre-synaptic neuron and an index "j" indicating a post-synaptic neuron.

Such a synaptic weight may vary with time-based on "learning rules." For example, an artificial neural network may learn based on the pattern of a spike signal input to the artificial neural network or a spike signal generated by the artificial neural network.

In supervised learning, an external monitoring agent is involved in determining whether to learn a given target function, whereas in unsupervised learning, there is no external monitoring agent involved in learning. In unsupervised learning, the artificial neural network learns statistical representations of input features. Spike-timing-dependent plasticity (STDP) learning is an example of unsupervised learning for SNN.

FIG. 1C is a view illustrating an example of an STDP learning function graph.

In the case of a synapse connecting a pre-synaptic neuron i and a post-synaptic neuron j, a synaptic weight $w_{ij}$ is determined by $\Delta t$ which is a difference between a post-synaptic spike generation time $t_{post}$ and a pre-synaptic spike generation time $t_{pre}$ as expressed by Equation 1 below.

$$\Delta t = t_{post} - t_{pre} \qquad \text{—Equation 1—}$$

$\Delta t$ is a positive number, and a corresponding synaptic weight is potentiated when a pre-synaptic spike and a post-synaptic spike have a causal relationship and is depressed when the pre-synaptic spike and the post-synaptic spike do not have a causal relationship. Synapse potentiation may be understood to be a strengthening of synapses based on recent patterns of activity in signal transmission between two neurons. Synapse depression may be understood to be a decrease in synaptic strength based on recent patterns of activity in signal transmission between two neurons.

In general, the value of an STDP learning function is non-zero in a limited time window [−Tmin, +Tmax]. For example, in the artificial SNN, Tmin and Tmax, e.g., in the range of less than 100 ms, may vary based on a dynamic time constant of the pattern to be learned.

FIGS. 2A to 2D are views illustrating examples of time-dependent STDP learning functions.

Figure 2A:
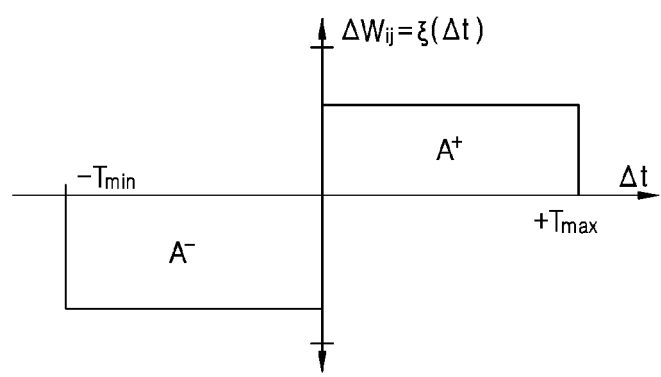
FIGS. 2A to 2D are views illustrating examples of time-dependent spike-timing-dependent plasticity (STDP) learning functions.

FIG. 2A is a view illustrating an example of a causal STDP learning function graph.

When the ratio of area A+ and area A− shown in FIG. 2A is similar to the ratio of area A+ and area A− shown in FIG. 1C, similar results of synapse potentiation and synapse depression are deduced.

Figure 2B:
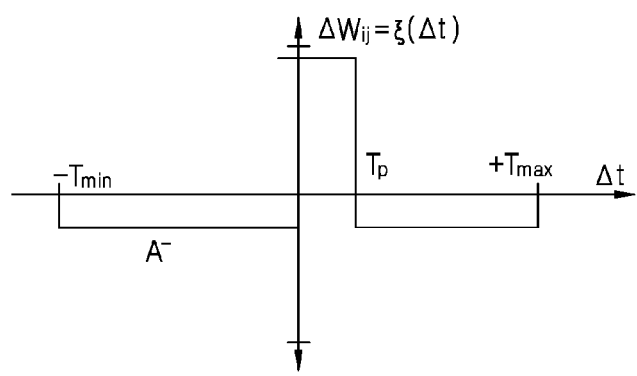

FIG. 2B is a view illustrating an example of a narrow potentiation window STDP learning function graph.

In a narrow potentiation window STDP learning function, potentiating learning is performed only in a narrow positive time window [0, Tp], and depressing learning is performed in the other time region of the time window [−Tmin, Tmax], i.e., time window [−Tmin, 0] and [Tp, +Tmax].

Figure 2C:
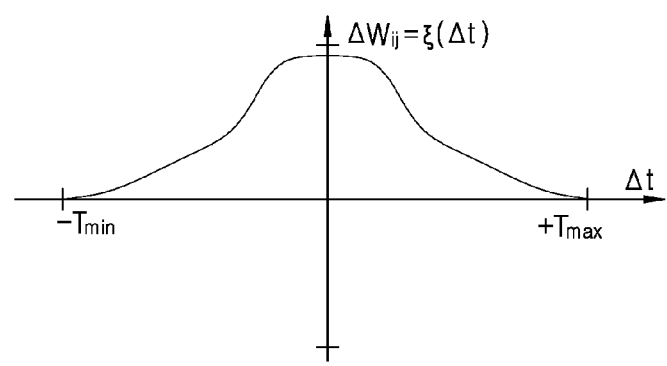

In indiscriminate depressing STDP, when Tmax extends to positive infinity and −Tmin extends to negative infinity, all synapses connecting a target neuron, generating a spike, to pre-synaptic neurons of the target neuron are depressed by a fixed amount, and net potentiation occurs at a synapse that has transmitted a spike signal from a pre-synaptic neuron to the target neuron within a certain period of time before the spike has generated in the target neuron. FIG. 2C is a view illustrating an example of a graph of a STDP learning function defining only a symmetric Hebbian potentiation.

Referring to FIG. 2C, when the difference between a pre-synaptic spike signal generation time and a post-synaptic spike signal generation time is within a certain period of time, regardless of the order of the signals, synapse potentiation may occur.

Figure 2D:
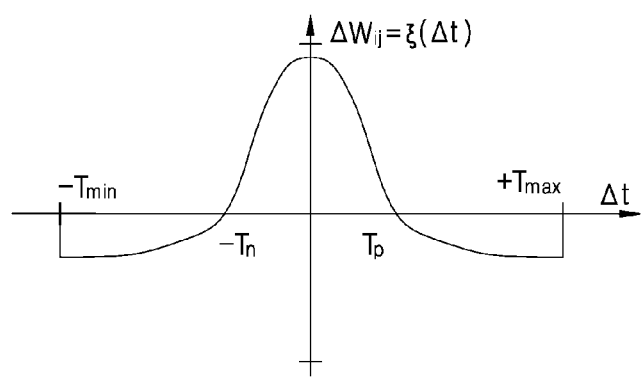

FIG. 2D is a view illustrating an example of a graph of a symmetric Hebbian STDP learning function having a narrow potentiation window.

Referring to FIG. 2D, when the difference between a pre-synaptic spike signal generation time and a post-synaptic spike signal generation time is within a limited time window [−Tn, Tp], potentiating learning occurs, while depressing learning occurs outside the limited time window.

In this example, when Tmax extends to positive infinity and −Tmin extends to negative infinity, depressing learning in accordance with the STDP learning function shown in FIG. 2D is referred to as a "symmetric indiscriminate depressing STDP."

As described above, FIGS. 2A to 2D show time-dependent learning functions. Therefore, when the time-dependent learning functions are implemented through hardware only or a combination of hardware and software instructions, e.g., software algorithms, a timestamp functioning as information indicating a spike generation time of a pre-synaptic neuron or a post-synaptic neuron may be utilized.

FIGS. 3A to 3D are views illustrating examples of order-dependent STDP learning functions.

Order-dependent learning functions may be obtained by replacing the time axis of the time-dependent learning functions with a discrete order. Therefore, STDP learning may be implemented based on an order-dependent learning functions by tracking the order of a pre-synaptic event in which a spike of a pre-synaptic neuron is generated and a post-synaptic event in which a spike of a post-synaptic neuron is generated, for example, an event list in which events of an entire artificial neural network system are recorded in order may be stored, or event lists of sub-systems may be separately stored. Alternatively, event lists of individual synapses may be separately stored. When storing an event list, the maximum number of events that may be stored in a time-dependent order may be set to N, and then a neural network may perform a learning process from recent events.

FIGS. 3A to 3D show order-dependent learning functions corresponding to those shown in FIGS. 2A to 2D. The horizontal axis is changed such that Δt, indicating the difference between a post-synaptic spike signal time and a pre-synaptic spike signal time, is replaced with Δn indicating the difference between an order index $n_{post}$ of a post-synaptic neuron spike and an order index $n_{pre}$ of a pre-synaptic neuron spike as shown in Equation 2 below.

$$\Delta n = n_{post} - n_{pre} \quad \text{Equation 2}$$

Order-based STDP learning is adapted to dynamics of neural activities. Since STDP is a time-based learning method, order-dependent STDP is fundamentally different from biological STDP which is an approach of attempting to computationally be related to biological neuron signaling, i.e., through processing hardware, by being dependent on dynamics and time constants ranging within a particular range. Here, though the biological STDP approach includes the reference to 'biology', this biological term is only used to indicate that a spike signal shape or timing dependencies may be related to empirical evidence of biological neurons, though not limited thereto, and is not intended to impart any relatedness in how the hardware or computational approaches or specialized hardware are actually implemented and how such biological neurons accomplish their functions.

Order-based STDP learning is performed independently of the rate at which events occur and dynamics. For example, even when time stamps of all spikes are multiplied by the same constant, the order is the same, and thus learning contents are not changed. Therefore, order-based STDP may have its own adaptability according to the speed and dynamics of events.

In general, when STDP is computationally implemented, a learning function applies a small deterministic synaptic change, for example, Δw or Δw/w equal to or less than of 1% or 0.1%, to a previous weight. At this time, the sequence of spikes is repeated while changing the order of stimuli, thereby preventing bias to a certain preference pattern.

Therefore, general STDP is deterministic and may use high resolution to store weight values for implementing a small change in a synaptic weight.

On the other hand, the resolution used for storing synaptic weight values may be decreased by applying stochastic features to learning processes. This may be implemented by applying a large amount of change at a small probability according to a stochastic learning method instead of applying a small change to a weight according to a deterministic learning method.

For example, a stochastic STDP learning model may be implemented using the learning functions shown in FIGS. 2A to 2D and 3A to 3D. This may be possible by changing the vertical axis indicating a weight change amount Δw to indicate a probability p that a weight is changed by a preset amount.

For example, a synaptic weight value may be a one-bit value, 1 or 0. When (Δt) or ξ(Δn) is a positive probability p (0<=p<=1), a random number x (0<=x<=1) may be generated, and a weight may be set to be 1 when x<=p and may be maintained when x>p. When, ξ (Δ t) or ξ (Δ n) is a negative probability p (0>=p>=−1), a random number x (0<=x<=1) may be generated, and a weight may be set to be 0 when x<=|p| and may be maintained when x>|p|.

Figure 4:
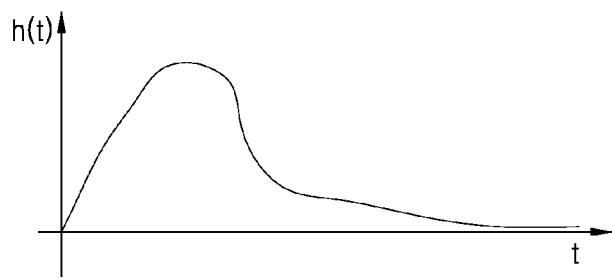
FIG. 4 is a view illustrating an example of a kernel function.

FIG. 4 is a view illustrating a kernel function.

The kernel function indicates the effect of an input event, that is, a signal input through a synapse, on an internal state variable of a neuron. The internal state variable may also be referred to as a membrane potential or computational membrane potential of a neuron, though this is not intended to impart any relatedness with respect to how the neural network architecture computationally decides the internal state or circumstances for producing or releasing spikes and how a biological membrane potential operates to control biological spike releases.

When the value of the internal state variable of the neuron exceeds a threshold value, the neuron may fire and output a spike signal.

For example, a state variable $x_k$ of a neuron is expressed by a time function satisfying a differential equation in a time domain as expressed by Equation 3 below.

$$\tau \dot{x}_k = -(x_k - x_{rest}) + \Sigma_i w_{ijk} h(t_i) \qquad \text{Equation 3}$$

In the differential equation above, $w_{ijk}$ refers to a synaptic weight between two neurons defined by an index i, corresponding to an input terminal or a pre-synaptic neuron and an index k corresponding to a current neuron, that is, a post-synaptic neuron. $x_{rest}$ is a state variable value in a rest state that may indicate a rest voltage or state of the computational neuron membrane potential. The term $-x_k$ of the right-hand side refers to a leakage mechanism decreasing with time according to a time constant $\tau$. When a neuron does not receive an input signal for a predetermined time, due to the leakage mechanism, the state variable of the neuron converges to the rest state value $x_{rest}$. The leakage mechanism may be implemented by an exponential attenuation or a linear attenuation hardware.

The kernel function h(t), which is an example function indicating the effect of an input signal on a state variable $x_k$ of a neuron k with respect to time, may increase in the degree of contribution to the state variable within a preset period of time after an input time and may then decrease in the degree of contribution to the state variable as shown in FIG. 4.

The function h (t) may be simplified to a delta function for the efficiency and/or ease of computational implementation. Therefore, at the time when an input signal is input, the state variable is immediately increased by the synaptic weight $w_{ijk}$.

Figure 5:
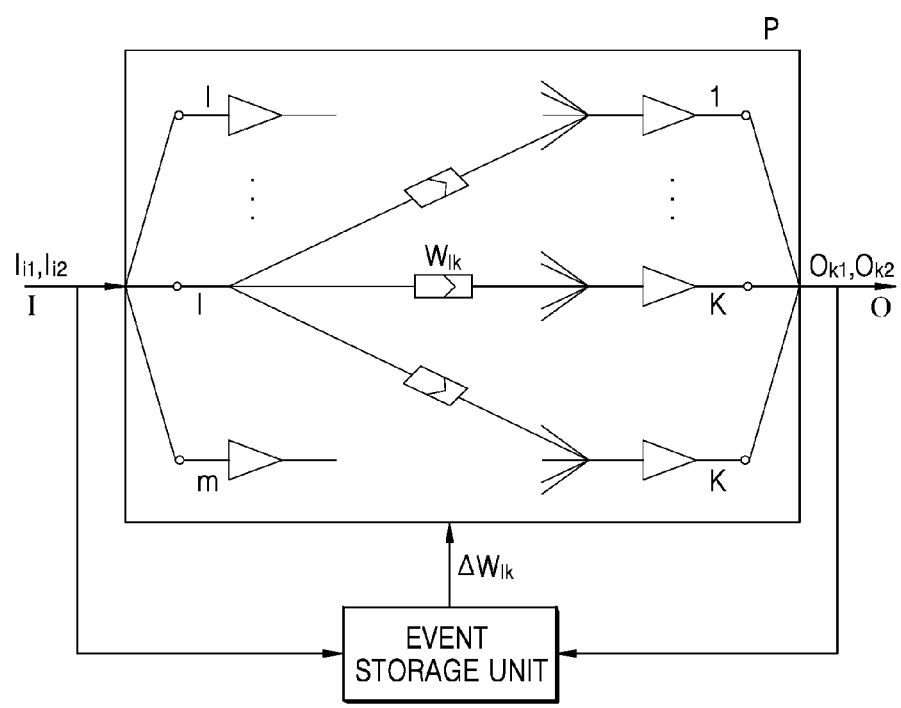
FIG. 5 is a view illustrating an example of an SNN layer population.

FIG. 5 is a view illustrating an example of a layer population P of an SNN.

In FIG. 5, the layer population P of the SNN (P is an integer) includes a plurality of neurons. For example, each of K neurons may be denoted with an index k (k=1, 2, . . . , and K). A signal $O_k$ output from each of the plurality of neurons is transmitted as an input signal to an upper layer population P+1 via an output channel O.

In addition, the layer population P includes a plurality of input terminals. For example, each of m input terminals may be denoted with an index i (i=1, 2, . . . , and m). The input terminals i receive input signals $I_i$ through an input channel I.

Further, in case of an input event in which the layer population P receives input signals, input times may be denoted with $t_n$, input terminals may be denoted with $i_n$, and the input signals may be denoted with $I_{i_n}$.

Similarly, in case of an output event in which at least one of the neurons of the layer population P outputs a spike signal, an output time may be denoted with $t_s$, the index of the neuron outputting the spike signal may be denoted with $k_s$, and then the output signal may be denoted with $O_k$.

For example, each SNN layer may include an event store unit.

Each time an input event occurs, the event storage unit may acquire information about the input event and make a list of pre-synaptic events according to time expressed by Equation 4 below.

$$\{(t_1, I_{i_1}), (t_2, I_{i_2}), (t_3, I_{i_n}), \ldots\} \qquad \text{Equation 4}$$

In addition, each time an output event occurs, the event storage unit may acquire information about the output event and make a list of post-synaptic events according to time as in Equation 5 below.

$$\{(t_1', O_{k_1}), (t_2', O_{k_2}), (t_3', O_{k_3}), \ldots\} \qquad \text{Equation 5}$$

Each time an input event $(t_{pre}, I_i)$ occurs, the SNN layer calculates $\Delta t = t_s - t_{pre} < 0$ for each output event $(t_s, O_{k_s})$ of the post-synaptic event list to obtain $\xi(\Delta t)$.

When $\xi(\Delta t)$ is greater than 0, $\xi(\Delta t)$ is a probability that a synaptic weight $\varpi_{ik_s}$ is set to be 1, and when $\xi(\Delta t)$ is less than 0, $\xi(\Delta t)$ is a probability that the synaptic weight $\varpi_{ik_s}$ is set to be 0.

Each time an output event $(t_{post}, o_k)$ occurs, the SNN layer calculates $\Delta t = t_{post} - t_n > 0$ for each input event $(t_n, I_{i_n})$ of the post-synaptic event list to obtain $\xi(\Delta t)$.

When $\xi(\Delta t)$ is greater than 0, $\xi(\Delta t)$ is a probability that a synaptic weight $\varpi_{i_n k}$ is set to be 1, and when $\xi(\Delta t)$ is less than 0, $\xi(\Delta t)$ is a probability that the synaptic weight $\varpi_{i_n k}$ is set to be 0.

In the case of the indiscriminate depressing STDP learning function described with reference to FIG. 2B, a post-synaptic event list may not be used, for example. Each time an output event occurs, STDP learning may be performed only by determining whether a potentiating learning region is in a positive region in the x-axis of FIG. 2B ($\Delta t = t_{post} - t_n >$), that is, $\Delta t$ is within the range of $\xi(\Delta t) > 0$.

In the case of order-based STDP, a pre-synaptic event list and a post-synaptic event list do not require additional information about time, and STDP learning is performed in order.

For example, a pre-synaptic event list may be expressed with input terminals and order-based indexes as shown by Equation 6 below.

$$\{I_{i_1}, I_{i_2}, \ldots, I_{i_a}, \ldots, I_{i_A}\} \qquad \text{Equation 6}$$

For example, a post-synaptic event list may be expressed with synapses having output spike signals and order-based indexes as shown by Equation 7 below.

$$\{O_{k_1}, O_{k_2}, \ldots, O_{k_b}, \ldots, O_{k_B}\} \qquad \text{Equation 7}$$

Each time an input event $I_i$ occurs, the SNN layer calculates $\Delta n = -(B-b) < 0$ for each output event $O_{k_b}$ of the post-synaptic event list to obtain $\xi(\Delta n)$.

When $\xi(\Delta t)$ is greater than 0, $\xi(\Delta t)$ is a probability that a synaptic weight $\varpi_{i,b}$ is set to be 1, and when $\xi(\Delta t)$ is less than 0, $\xi(\Delta t)$ is a probability that the synaptic weight $\varpi_{i,b}$ is set to be 0.

Each time an output event $O_k$ occurs, the SNN layer calculates $\Delta n = (A-a) > 0$ for each input event $I_{i_a}$ of the post-synaptic event list to obtain $\xi(\Delta n)$.

When $\xi(\Delta t)$ is greater than 0, $\xi(\Delta n)$ is a probability that a synaptic weight $\varpi_{i_a k}$ is set to be 1, and when $\xi(\Delta t)$ is less than 0, $\xi(\Delta n)$ is a probability that the synaptic weight $\varpi_{i_a k}$ is set to be 0.

Figure 3A:
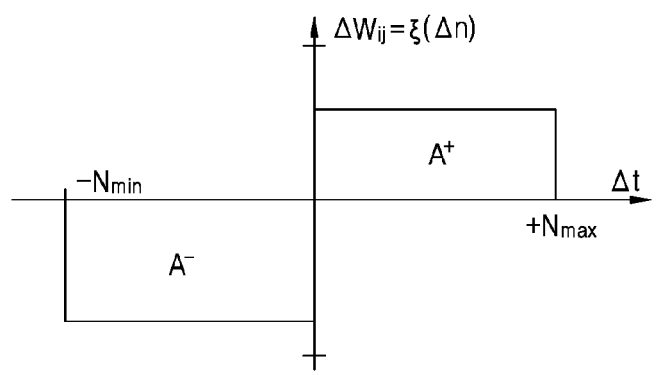
FIGS. 3A to 3D are views illustrating examples of order-dependent STDP learning functions.
Figure 3B:
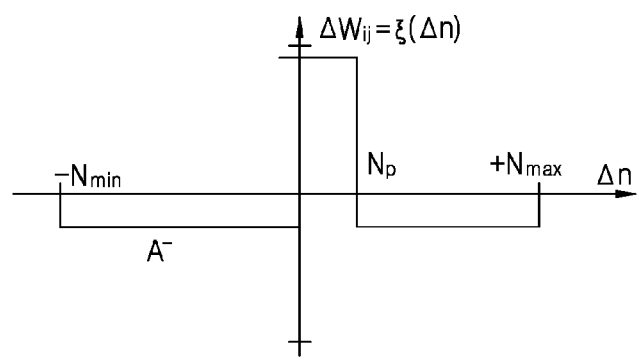
Figure 3C:
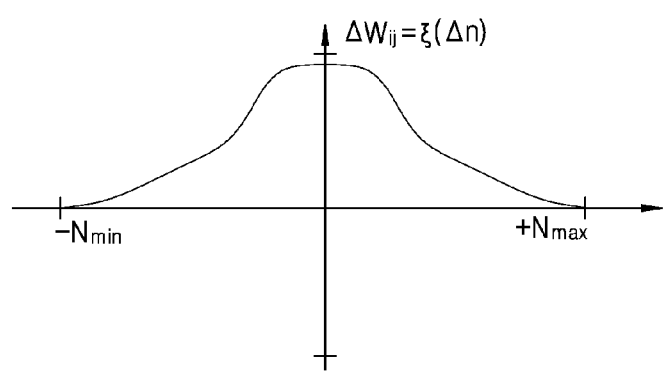
Figure 3D:
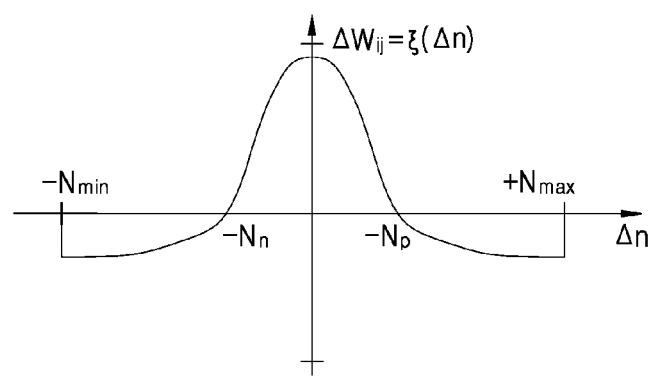

In the case of the indiscriminate depressing STDP learning function described with reference to FIG. 3B, a post-synaptic event list may not be used, for example. Each time an output event occurs, STDP learning may be performed only by determining whether a potentiating learning region is in a positive region in the x-axis of FIG. 3B ($\Delta n = (A-a) > 0$), that is, $\Delta n$ is within the range of $\xi(\Delta n) > 0$.

Figure 6:
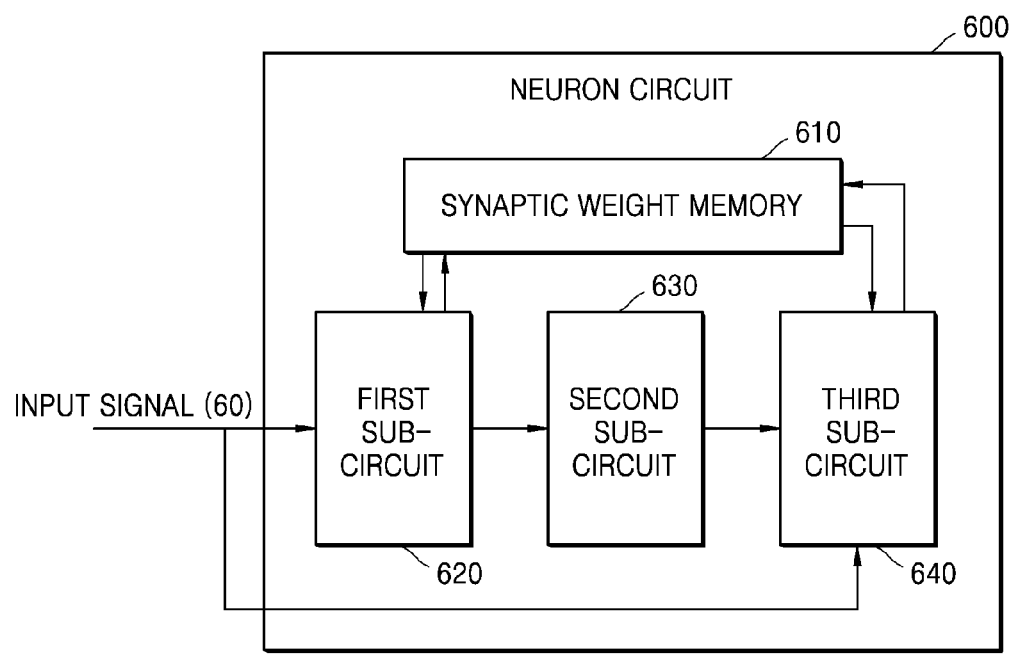
FIG. 6 is a block diagram illustrating an example of a neuron circuit.

FIG. 6 is a block diagram illustrating an example of a neuron circuit 600.

Referring to FIG. 6, the neuron circuit 600 may include a synaptic weight memory 610, a first sub-circuit 620, a second sub-circuit 630, and a third sub-circuit 640, noting that examples are not limited thereto and additional or other components may be included in varying examples.

The synaptic weight memory 610 may store a plurality of synaptic weight values. For example, the synaptic weight values may be one-bit data. The synaptic weight values may have binary values including an active value or an inactive value. For example, the active value may be 1, and the inactive value may be 0. However, this is a non-limiting example.

A synapse having an active value as a synaptic weight value is defined as an active synapse (connected), and a synapse having an inactive value as a synaptic weight value is defined as an inactive synapse (disconnected).

The synaptic weight memory 610 may store synaptic weight values respectively corresponding to a plurality of pre-synaptic neuron circuits. For example, the synaptic weight memory 610 may store the synaptic weight values of the plurality of pre-synaptic neuron circuits respectively in a plurality of cells.

The synaptic weight memory 610 may be accessible from other components of the neuron circuit 600 or external components. For example, as cell information and a read process request signal are applied, the synaptic weight memory 610 may output a synaptic weight value corresponding to the cell address information. Accordingly, a component having transmitted the read process request signal may obtain the synaptic weight value corresponding to the cell address information. In addition, when cell address information, a write process request signal, and a weight value are applied, a synaptic weight value of the synaptic weight memory 610 corresponding to the cell address information may be set to be the applied weight value.

The first sub-circuit 620 may receive an input signal from a pre-synaptic neuron circuit and may determine whether the received input signal is an active signal having an active synaptic weight value.

For example, the first sub-circuit 620 may receive an input signal. The input signal may be a signal output from a pre-synaptic neuron circuit of the neuron circuit 600. For example, the input signal may be a spike signal output from the pre-synaptic neuron circuit.

In addition, the input signal may include signals output from a plurality of pre-synaptic neuron circuits. For example, spike signals output from at least some of the plurality of pre-pre-synaptic neuron circuits may be input selectively or in combination as the input signal.

For example, the input signal may include information for identifying a pre-synaptic neuron circuit that has output a spike signal. In another example, the input signal may include information indicating that a pre-synaptic neuron circuit has output a spike signal and/or identification information about the pre-synaptic neuron circuit. For example, identification information contained in the input signal may include unique information of a pre-synaptic neuron circuit. In addition, the identification information included in the input signal may include address information about a cell of the synaptic weight memory 610 in which the synaptic weight value of the pre-synaptic neuron circuit is stored.

The first sub-circuit 620 may determine whether the input signal is an active input signal, that is, a synaptic weight value corresponding to the input signal is an active value. For example, the first sub-circuit 620 may acquire a synaptic weight value corresponding to the input signal from the synaptic weight memory 610. For example, the first sub-circuit 620 may apply a read process request signal and synapse cell address information included in the input signal to the synaptic weight memory 610. In addition, the first sub-circuit 620 may acquire a synaptic weight value corresponding to the synapse cell address information from the synaptic weight memory 610. When the acquired synaptic weight value is an active value, the first sub-circuit 620 may determine that the input signal is an active signal. When the acquired synaptic weight value is an inactive value, the first sub-circuit 620 may determine that the input signal is not an active signal. When the first sub-circuit 620 determines that the input signal is an active signal, the first sub-circuit 620 may apply a signal to the second sub-circuit 630 to report the reception of the active signal.

As the second sub-circuit 630 receives the signal reporting the reception of the active signal from the first sub-circuit 620, the second sub-circuit 630 may perform a calculation to compare a first cumulative reception counter with a learning threshold value, where the first cumulative reception counter indicates the number of times active input signals are received.

Each time an active input signal is received, the second sub-circuit 630 may increase a first cumulative reception counter of active input signals. In addition, when the second sub-circuit 630 determines that the first cumulative reception counter is equal to or greater than the learning threshold value, the second sub-circuit 630 may reset the first cumulative reception counter.

In addition, when the second sub-circuit 630 determines that the first cumulative reception counter is equal to or greater than the learning threshold value, the second sub-circuit 630 may increase the learning threshold value. In an example, the learning threshold value may have an upper limit. When the learning threshold value is equal to the upper limit of the learning threshold value, the second sub-circuit 630 may maintain the learning threshold value at the upper limit. In another example, the learning threshold value may be a fixed value.

When the second sub-circuit 630 determines that the first cumulative reception counter is equal to or greater than the learning threshold value, the second sub-circuit 630 may apply a learning request signal to the third sub-circuit 640.

As the third sub-circuit 640 receives the learning request signal from the second sub-circuit 630, the third sub-circuit 640 may perform a learning process to adjust a synaptic weight value.

The third sub-circuit 640 may perform a potentiating learning process to stochastically set a synaptic weight value corresponding to the active input signal to an active value.

For example, in response to an input event in which an input signal is received, the third sub-circuit 640 may acquire information about the input event. The information about the input event may include identification information about a pre-synaptic neuron circuit included in the input signal. As described above, the identification information about the pre-synaptic neuron circuit may include, but is not limited to, synapse information such as address information about a cell in which a synaptic weight value corresponding to the pre-synaptic neuron circuit is stored.

The third sub-circuit 640 may perform the potentiating learning process to stochastically set a synaptic weight value of the synaptic weight memory 610 corresponding to the input signal to an active value. For example, the third sub-circuit 640 may store information about a plurality of input events. In addition, the third sub-circuit 640 may stochastically determine whether to perform a synapse potentiating process in which synaptic weight values corresponding to at least some of the plurality of input events are set to be active values.

For example, the third sub-circuit 640 may independently determine whether to perform a synapse potentiating process on each of the at least some of the plurality of input events.

A first probability, being a synapse potentiating probability, may be preset. For example, the first probability may be a constant, but is not limited thereto.

In addition, the third sub-circuit 640 may perform a potentiating learning process on a preset number of input events among a plurality of previously stored input events. In this case, the third sub-circuit 640 may perform the potentiating learning process on a preset number of input events among previously stored input events in a reverse order to the order in which the input events are stored. When the number of previously stored input events is less than the preset number, the third sub-circuit 640 may perform the potentiating learning process on all of the previously stored input events.

The third sub-circuit 640 may perform a depressing learning process to stochastically set synaptic weight values of the synaptic weight memory 610 to an inactive value. For example, the third sub-circuit 640 may stochastically determine whether to perform a synapse depressing process in which each of a plurality of synaptic weight values in the synaptic weight memory 610 is set to an inactive value.

The third sub-circuit 640 may independently determine whether to perform a synapse depressing process on each of a plurality of synaptic weight values.

A second probability, being a synapse depressing probability, may be determined based on a plurality of synaptic weight values. For example, the second probability may be determined based on the number of active synapses having active synaptic weight values among a plurality of synapses.

The third sub-circuit 640 may perform a depressing learning process on at least some of a plurality of synapses in the synaptic weight memory 610. For example, the third sub-circuit 640 may perform a depressing learning process on all synapses in the synaptic weight memory 610. Alternatively, the third sub-circuit 640 may perform a depressing learning process on synapses in the synaptic weight memory 610 on which a potentiating process has not yet been performed.

Figure 7:
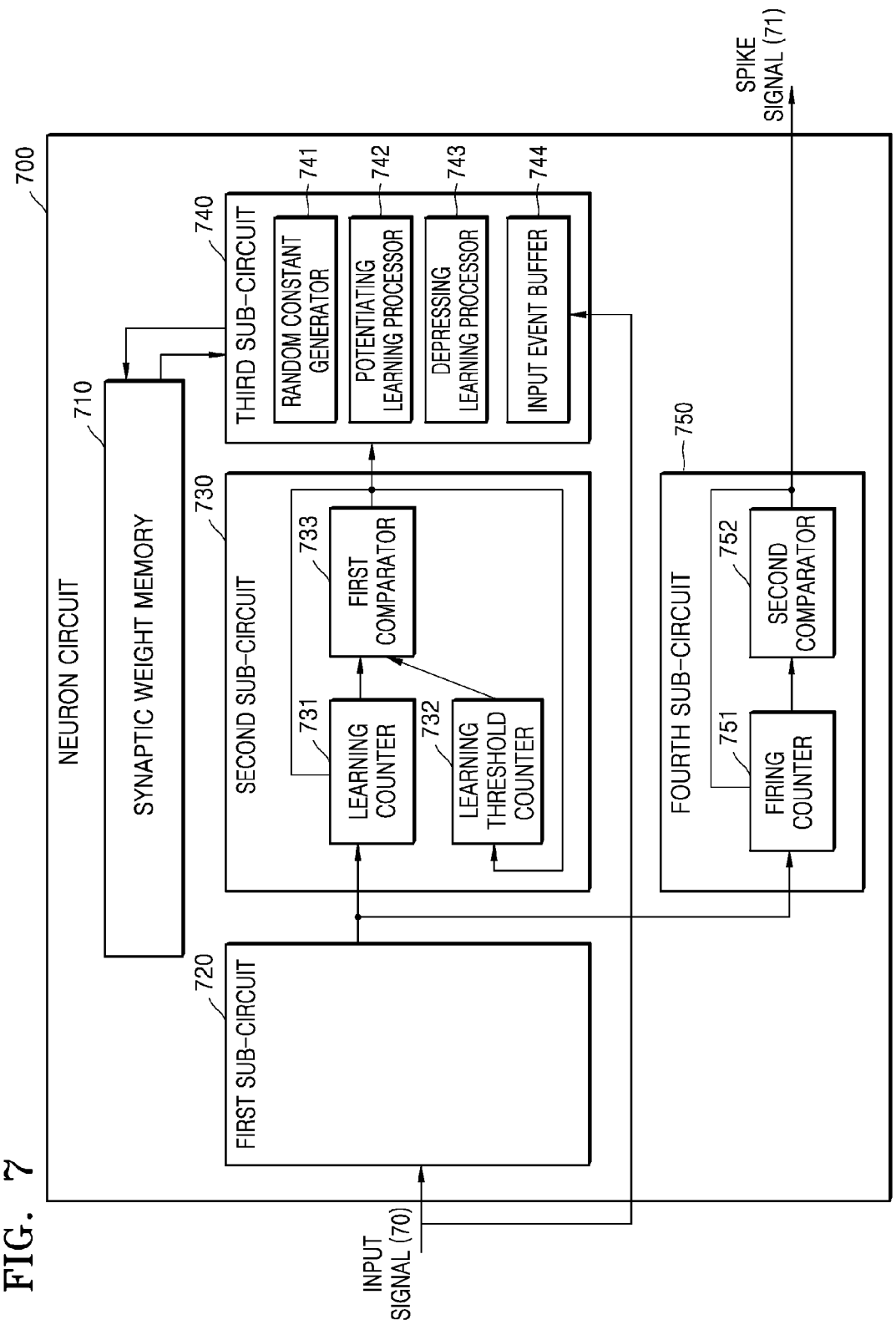
FIG. 7 is a block diagram illustrating an example of a neuron circuit.

FIG. 7 is a block diagram illustrating an example of a neuron circuit 700.

The neuron circuit 700 may include a synaptic weight memory 710, a first sub-circuit 720, a second sub-circuit 730, a third sub-circuit 740, and a fourth sub-circuit 750.

The embodiment including the synaptic weight memory 610, the first sub-circuit 620, the second sub-circuit 630, and the third sub-circuit 640 shown in FIG. 6 may be applied to the synaptic weight memory 710, the first sub-circuit 720, the second sub-circuit 730, and the third sub-circuit 740 shown in FIG. 7, and repeated descriptions thereof will be omitted.

The first sub-circuit 720 may apply a signal indicating reception of an active signal to each of the second sub-circuit 730 and the fourth sub-circuit 750.

The second sub-circuit 730 may include a learning counter 731, a learning threshold counter 732, and a first comparator 733.

The learning counter 731 may count and output a first cumulative reception counter of active input signals, where the first cumulative reception counter indicates the number of times active input signals are received. For example, an output count value of the learning counter 731 may increase when the learning counter 731 receives a signal indicating reception of an active input signal from the first sub-circuit 720.

The learning threshold counter 732 may count and output learning threshold values. The output count value of the learning threshold counter 732 may have a preset initial value. The output count value of the learning threshold counter 732 may increase based on an output value of the first comparator 733.

The first comparator 733 may receive the output count value of the learning counter 731 and the output count value of the learning threshold counter 732 to perform a comparison process. When the output count value of the learning counter 731 and the output count value of the learning threshold counter 732 are equal, the first comparator 733 may output a learning request signal. For example, the first comparator 733 may output a one-bit signal. The first comparator 733 may output 1 when the output count value of the learning counter 731 and the output count value of the learning threshold counter 732 are equal, and may output 0 when the output count value of the learning counter 731 and the output count value of the learning threshold counter 732 are different.

An output value of the first comparator 733 may be input to the learning threshold counter 732. For example, the output count value of the learning threshold counter 732 may increase when the output value of the first comparator 733 toggles from 0 to 1.

In addition, the output value of the first comparator 733 may be applied as a reset signal to the learning counter 731. For example, when the output value of the first comparator 733 is 1, the output count value of the learning counter 731 may be reset to 0.

The third sub-circuit 740 may include a random constant generator 741, a potentiating learning processor 742, a depressing learning processor 743, and an input event buffer 744.

The third sub-circuit 740 may include the random constant generator 741 to generate a random constant within a certain range. For example, when the random constant generator 741 is configured to output a 10-bit value, the random constant generator 741 may output a random constant within the range of from 0 to 1023, as non-limiting examples. For example, the random constant generator 741 may be, but is not limited to, a linear feedback shift register (LFSR).

When an input event in which the neuron circuit 700 receives an input signal occurs, the input event buffer 744 may store information on the input event. For example, the input event buffer 744 may store information about a plurality of input events. The information about the input event may include identification information about a pre-synaptic neuron circuit included in the input signal. As described above, the identification information about the pre-synaptic neuron circuit may include, but is not limited to, synapse information such as address information about a cell in which a synaptic weight value corresponding to the pre-synaptic neuron circuit is stored. When the input event buffer 744 is full, the input event buffer 744 may delete the earliest input event information and may store new input event information. For example, the input event buffer 744 may be a circular buffer.

When the third sub-circuit 740 receives a learning request signal from the second sub-circuit 730, the third sub-circuit 740 may perform a potentiating learning process using the potentiating learning processor 742.

The potentiating learning processor 742 may perform a potentiating learning process to stochastically set a synaptic weight value corresponding to a received input signal to an active value. For example, the potentiating learning processor 742 may perform a potentiating learning process to stochastically set synaptic weight values corresponding to a plurality of received input signals to an active value. For example, the potentiating learning processor 742 may stochastically determine whether to perform a synapse potentiating process in which synaptic weight values corresponding to at least some of a plurality of input events stored in the input event buffer 744 are set to an active value.

For example, the potentiating learning processor 742 may independently determine whether to perform a synapse potentiating process on each of the at least some of the plurality of input events.

A first probability being a synapse potentiating probability may be preset. For example, the first probability may be a constant, but is not limited thereto.

For example, the potentiating learning processor 742 may perform a potentiating process on a preset number of input events that are previously stored in the input event buffer 744. For example, the potentiating learning processor 742 may perform a potentiating process on a preset number of input events previously stored in the input event buffer 744 in a reverse order to the order in which the input events are stored. When the number of input events previously stored in the input event buffer 744 is less than the preset number, the potentiating learning processor 742 may perform the potentiating learning process on all the input events previously stored in the input event buffer 744.

The potentiating learning processor 742 may determine whether to perform a synapse potentiating process by comparing a random constant value acquired from the random constant generator 741 and a potentiating learning reference constant determined based on the first probability. For example, when the random constant is less than or not greater than a potentiating learning reference constant value calculated by multiplying the upper limit of the random constant by the first probability, the potentiating learning processor 742 may perform a synapse potentiating process. That is, the potentiating learning processor 742 may set a synaptic weight value of the synaptic weight memory 710, corresponding to learning target input event information, to an active value. The potentiating learning processor 742 may apply cell address information corresponding to an input event, a write request signal, and an active value to the synaptic weight memory 710.

In addition, when the random constant is greater than or not less than the potentiating learning reference constant, the potentiating learning processor 742 may perform a synapse potentiating process.

The depressing learning processor 743 may perform a depressing learning process to stochastically set synaptic weight values of the synaptic weight memory 710 to an inactive value. The depressing learning processor 743 may perform a depressing learning process after the potentiating learning processor 742 performs a potentiating learning process.

The depressing learning processor 743 may perform a depressing learning process on at least some of a plurality of synapses in the synaptic weight memory 710.

For example, the depressing learning processor 743 may perform a depressing learning process on all of the synapses in the synaptic weight memory 710. Alternatively, the depressing learning processor 743 may perform a depressing learning process on synapses in the synaptic weight memory 710 on which a potentiating learning process has not been performed.

The depressing learning processor 743 may stochastically determine whether to perform a synapse depressing process in which each of the synaptic weight values in the synaptic weight memory 710 is set to an inactive value.

For example, the depressing learning processor 743 may independently determine whether to perform a synapse depressing process on a plurality of synaptic weight values.

The depressing learning processor 743 may determine a second probability, which is a synapse depressing probability, based on a plurality of synaptic weight values. For example, the second probability may be determined based on the number of active synapses having active synaptic weight values among a plurality of synapses. For example, the ratio of the difference between a preset proper number of active synapses and the number of active synapses to the number of active synapses may be set to the second probability.

The depressing learning processor 743 may determine whether to perform a synapse depressing process by comparing a random constant acquired from the random constant generator 741 and a depressing learning reference constant determined based on the second probability. For example, when the random constant is less than a depressing learning reference constant calculated by multiplying the upper limit of the random constant by the second probability, the depressing learning processor 743 may perform the synapse depressing process. That is, when the random constant is less than or not greater than the depressing learning reference constant, the depressing learning processor 743 may set synaptic weight values of the synaptic weight memory 710 to an inactive value. The depressing learning processor 743 may apply cell address information corresponding to a depressing target synaptic weight, a write request signal, and an inactive value to the synaptic weight memory 710.

In another example, when the random constant is greater than or equal to the depressing learning reference constant, the depressing learning processor 743 may perform a synapse depressing process.

The fourth sub-circuit 750 may compare a second cumulative reception counter of active input signals with a firing threshold value. In addition, when the second cumulative reception counter of active input signals reaches the firing threshold value, the fourth sub-circuit 750 may transmit a spike signal 71 to a post-synaptic neuron circuit of the neuron circuit 700.

The fourth sub-circuit 750 may include a firing counter 751 and a second comparator 752. The firing counter 751 may count and output a second cumulative reception counter of active input signals. For example, the output count value of the firing counter 751 may increase when the firing counter 751 receives a signal indicating reception of an active input signal from the first sub-circuit 720.

The second comparator 752 may receive the output count value of the firing counter 751 and the firing threshold value to perform a comparison process. The firing threshold value may be a preset constant. For example, the firing threshold value may be a pre-stored value or a value received from an external component.

The second comparator 752 may output the spike signal 71 when the output count value of the firing counter 751 and the firing threshold value are equal. For example, the second comparator 752 may output a one-bit signal. At this time, the second comparator 752 may output 1 when the output count value of the firing counter 751 and the firing threshold value are equal and may output 0 when the output count value of the firing counter 751 and the firing threshold value are different. When the output value of the second comparator 752 is 1, the spike signal 71 is output.

In addition, the output value of the second comparator 752 may be applied as a reset signal to the firing counter 751. For example, when the output value of the second comparator 752 is 1, the output count value of the firing counter 751 may be reset to 0.

The spike signal 71 of the second comparator 752 may be applied to a post-synaptic neuron circuit of the neuron circuit 700.

Figure 8:
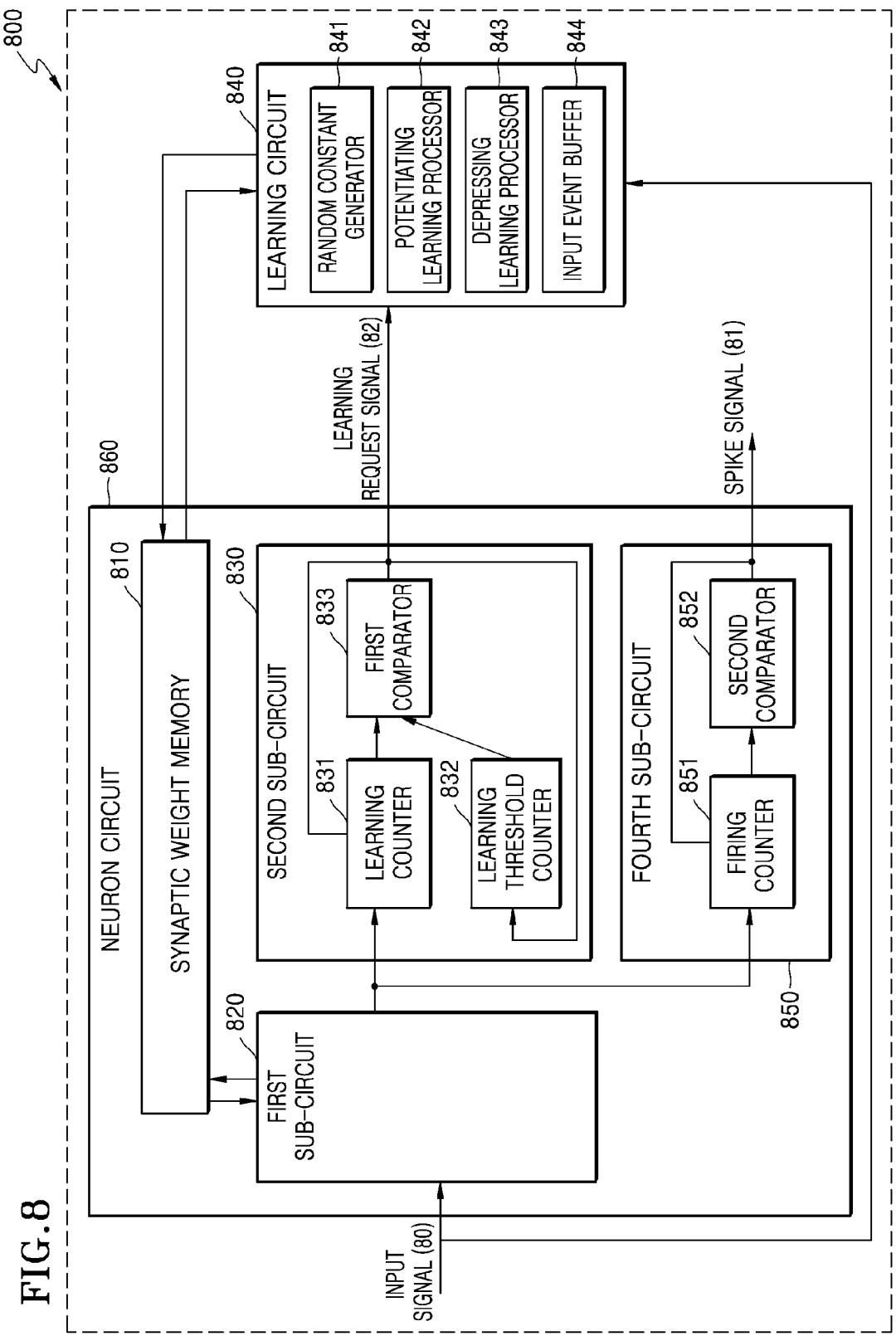
FIG. 8 is a view illustrating an example of a synapse weight learning system.

FIG. 8 is a view illustrating an example of a synapse weight learning system 800.

The synapse weight learning system 800 may include a neuron circuit 860 and a learning circuit 840.

In FIG. 7, the third sub-circuit 740 of the neuron circuit 700 performs a synapse weight learning process. However, in FIG. 8, the learning circuit 840 provided outside the neuron circuit 860 may perform a synapse weight learning process.

The examples including the synaptic weight memories 610 and 710 and the first sub-circuits 620 and 720 shown in FIGS. 6 and 7 may be applied to a synaptic weight memory 810 and a first sub-circuit 820 shown in FIG. 8. In addition, the examples including the second sub-circuits 630 and 730, the learning counter 731, the learning threshold counter 732, and the first comparator 733 shown in FIGS. 6 and 7 may be applied to a second sub-circuit 830, a learning counter 831, a learning threshold counter 832, and a first comparator 833 shown in FIG. 8, respectively. The example including the fourth sub-circuit 750, the firing counter 751, and the second comparator 752 shown in FIG. 7 may be applied to a fourth sub-circuit 850, a firing counter 851, and a second comparator 852 shown in FIG. 8, respectively.

In addition, the examples including the third sub-circuits 640 and 740, the random constant generator 741, the potentiating learning processor 742, the depressing learning processor 743, and the input event buffer 744 shown in FIGS. 6 and 7 may be applied to the learning circuit 840, a random constant generator 841, a potentiating learning processor 842, a depressing learning processor 843, and an input event buffer 844, respectively. Therefore, in the following description provided with reference to FIG. 8, the same descriptions as those given with reference to FIGS. 6 and 7 will not be repeated.

The neuron circuit 860 may determine whether a received input signal is an active signal having an active synapse value, and when a first cumulative reception counter of active input signals reaches a learning threshold value, the neuron circuit 860 may transmit a learning request signal to the learning circuit 840.

The neuron circuit 860 may transmit a learning request signal of the first comparator 833 of the second sub-circuit 830 to the learning circuit 840. In addition, the neuron circuit 860 may transmit identification information about the neuron circuit 860 to the learning circuit 840 together with the learning request signal. Accordingly, the learning circuit 840 may identify the neuron circuit 860 that has transmitted the learning request signal, based on the identification information about the neuron circuit 860.

As the learning circuit 840 receives the learning request signal from the neuron circuit 860, the potentiating learning processor 842 and the depressing learning processor 843 may access the synaptic weight memory 810 of the neuron circuit 860 and may perform a potentiating learning process and a depressing learning process, respectively.

Figure 9:
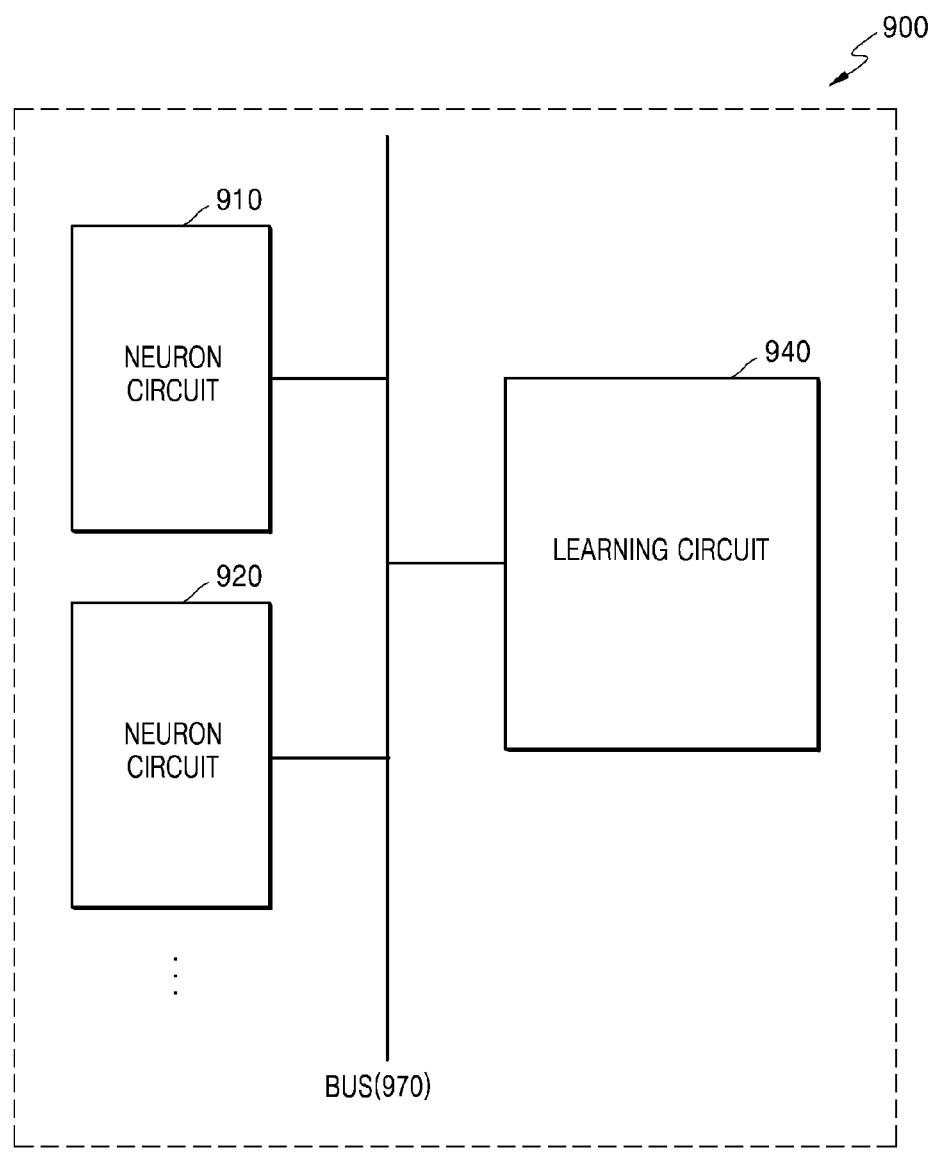
FIG. 9 is a view illustrating an example of a synapse weight learning system for a plurality of neuron circuits.

FIG. 9 is a view illustrating an example of a synapse weight learning system 900 including a plurality of neuron circuits 910 and 920.

The neuron circuit 860 of the example shown in FIG. 8 may be applied to the plurality of neuron circuits 910 and 920, and the learning circuit 840 of the example shown in FIG. 8 may be applied to a learning circuit 940.

The learning circuit 940 may perform a synapse weight learning process on the plurality of neuron circuits 910 and 920. In addition, the plurality of neuron circuits 910 and 920 may identify each other using identification information.

The plurality of neuron circuits 910 and 920 and the learning circuit 940 may communicate with each other through a bus 970. The learning circuit 940 may receive a learning request signal from each of the plurality of neuron circuits 910 and 920 through the bus 970. As the learning circuit 940 receives a learning request signal and identification information from the neuron circuits 910 and 920, the learning circuit 940 may transmit and receive information to and from a neuron circuit corresponding to the identification information by using the identification information. Accordingly, the learning circuit 940 may perform a synapse weight learning process on a neuron circuit corresponding to the identification information.

Figure 10:
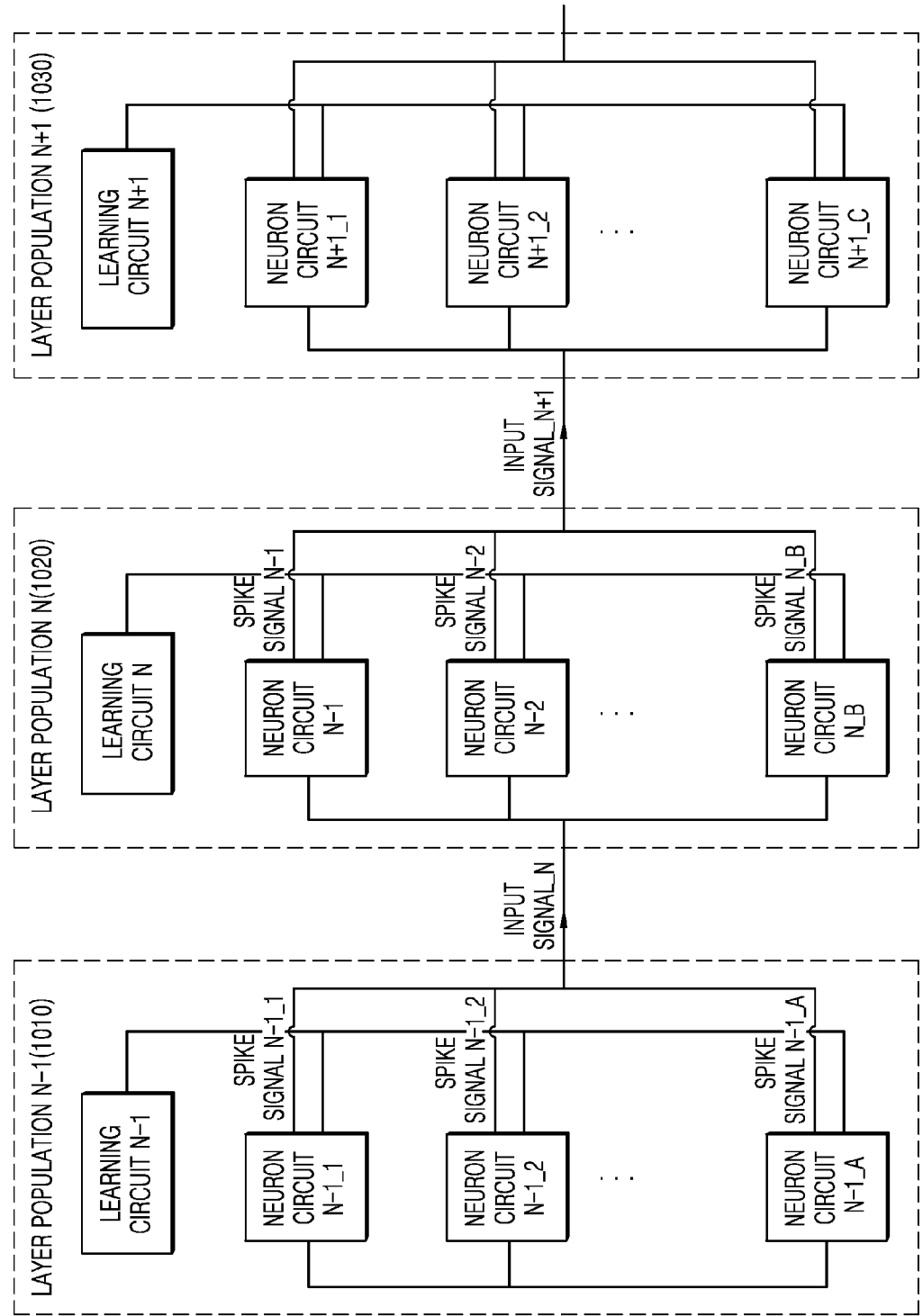
FIG. 10 is a view illustrating an example of a learning system for hierarchical neuron circuit populations.

FIG. 10 is a view illustrating an example of a learning system for hierarchical neuron circuit populations.

The learning system may include a plurality of hierarchical populations. Each of the hierarchical populations may include a plurality of neuron circuits and a learning circuit.

Spike signals respectively output from the neuron circuits of one hierarchical population may be applied as input signals to the next hierarchical population.

For example, spike signals (a spike signal N−1_1, a spike signal N−1_2, . . . , and a spike signal N−1_A) respectively output from neuron circuits (a neuron circuit N−1_1, a neuron circuit N−1_2, . . . , and a neuron circuit N−1_A) of a hierarchical population N−1 may be applied as input signals (input signal N) to a hierarchical population N.

Similarly, spike signals (a spike signal N_1, a spike signal N_2, . . . , and a spike signal N_A) respectively output from neuron circuits (a neuron circuit N_1, a neuron circuit N_2, . . . , and a neuron circuit N_A) of a hierarchical population N may be applied as input signals (input signal N+1) to a hierarchical population N+1.

Furthermore, in each of the hierarchical populations, the learning circuit may perform a synapse learning process on the plurality of neuron circuits. For example, the learning circuit N−1, the learning circuit N, and the learning circuit N+1 may respectively perform synapse learning processes on the neuron circuits of the hierarchical population N−1, the hierarchical population N, and the hierarchical population N+1. The neuron circuits and the learning circuits of the embodiments shown in FIGS. 8 and 9 may be applied to the plurality of neuron circuits and the learning circuits of FIG. 10, for example.

Figure 11:
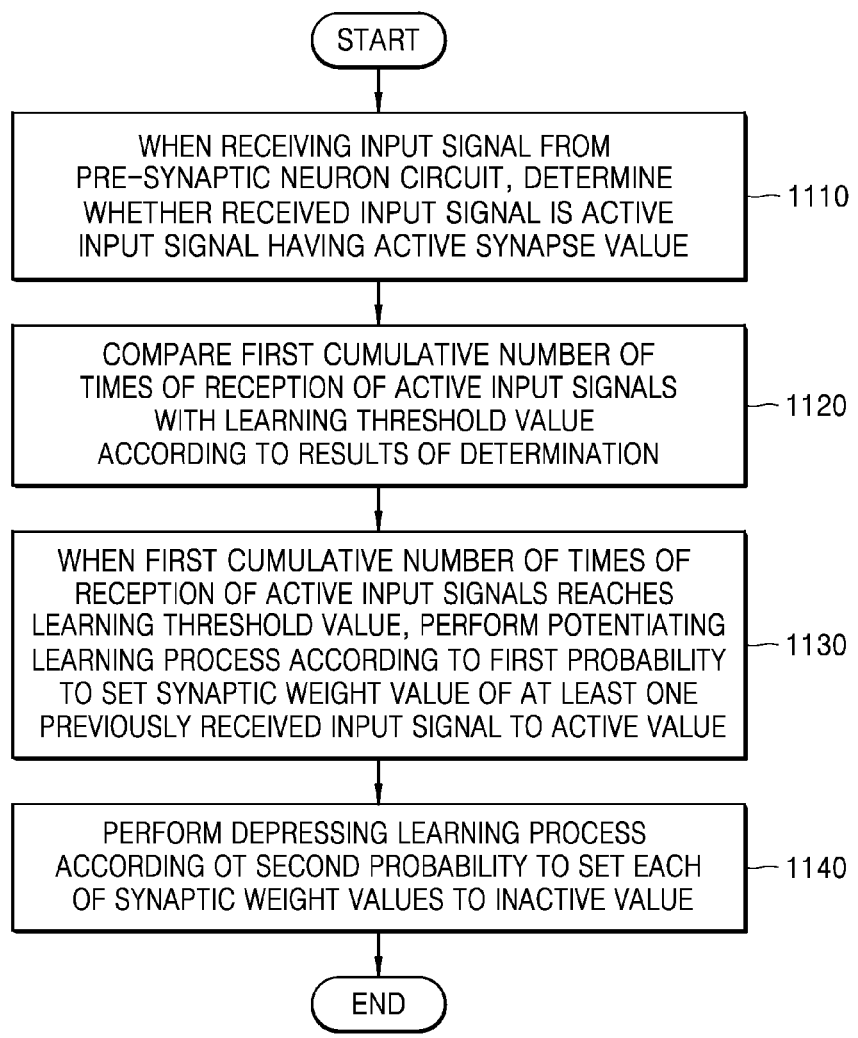
FIG. 11 is a flowchart illustrating an example of a synapse weight learning method for a neuron circuit.

FIG. 11 is a flowchart illustrating an example of a synapse weight learning method for a neuron circuit.

In process 1110, the neuron circuit may receive an input signal from a pre-synaptic neuron circuit and may determine whether the received input signal is an active signal having an active synaptic weight value.

The neuron circuit may store a plurality of synaptic weight values. For example, the neuron circuit may store synaptic weight values respectively corresponding to a plurality of pre-synaptic neuron circuits. For example, the synaptic weight value may be a one-bit information. The synaptic weight value may have a binary value including an active or inactive value. For example, the active value may be 1, and the inactive value may be 0. However, this is a non-limiting example. At this time, a synapse having an active synaptic weight value is defined as an active synapse, and a synapse having an inactive synaptic weight value is defined as an inactive synapse.

The neuron circuit may receive an input signal. The input signal may be a signal output from a pre-synaptic neuron circuit of the neuron circuit. For example, the input signal may be a spike signal output from the pre-synaptic neuron circuit. In addition, the input signal may include signals output from a plurality of pre-synaptic neuron circuits. For example, spike signals output from at least some of the plurality of pre-synaptic neuron circuits may be input selectively or in combination as the input signal.

For example, the input signal may include information for identifying a pre-synaptic neuron circuit that has output a spike signal. In another example, the input signal may include information indicating that a pre-synaptic neuron circuit has output a spike signal and/or identification information about the pre-synaptic neuron circuit. For example, identification information contained in the input signal may include unique identification information of a pre-synaptic neuron circuit. In addition, the identification information included in the input signal may include address information about a cell of a memory in which a synaptic weight value of the pre-synaptic neuron circuit is stored.

The neuron circuit may determine whether the input signal is an active input signal, that is, a synaptic weight value corresponding to the input signal is an active value. For example, the neuron circuit may acquire a synaptic weight value corresponding to the input signal. When the acquired synaptic weight value is an active value, the neuron circuit may determine that the input signal is an active signal. When the acquired synaptic weight value is an inactive value, the neuron circuit may determine that the input signal is not an active signal.

In process 1120, when the input signal is determined as an active signal, the neuron circuit may compare a first cumulative reception counter of active input signals with a learning threshold value.

When the neuron circuit determines that the first cumulative reception counter reaches the learning threshold value, the neuron circuit may reset the first cumulative reception counter.

For example, when the neuron circuit determines that the first cumulative reception counter reaches the learning threshold value, the neuron circuit may increase the learning threshold value. According to an example, the learning threshold value may have an upper limit. When the learning threshold value is equal to the upper limit of the learning threshold value, the neuron circuit may maintain the learning threshold value at the upper limit. In another example, the learning threshold value may be a fixed value.

In process 1130, when the first cumulative reception counter reaches the learning threshold value, the neuron circuit may perform a potentiating learning process to set the synaptic weight value of at least one input signal previously received to be an active value.

For example, when the neuron circuit determines that the first cumulative reception counter reaches the learning threshold value, the neuron circuit may perform a potentiating learning process to adjust a synaptic weight value.

The neuron circuit may perform a potentiating learning process to stochastically set a synaptic weight value corresponding to the received input signal to an active value.

When an input event in which an input signal is received occurs, the neuron circuit may acquire information about the input event. The neuron circuit may store information about a plurality of input events. In addition, the neuron circuit may stochastically determine whether to perform a synapse potentiating process in which synaptic weight values corresponding to at least some of a plurality of input events are set to an active value. At this time, the neuron circuit may independently determine whether to perform a synapse potentiating process on each of the at least some of the plurality of input events.

The information about the input event may include identification information about a pre-synaptic neuron circuit included in the input signal. As described above, the identification information about the pre-synaptic neuron circuit may include, but is not limited to, synapse information such as information about an address at which a synaptic weight value corresponding to the pre-synaptic neuron circuit is stored.

The neuron circuit may perform a potentiating learning process on a preset number of input events among a plurality of previously stored input events. At this time, the neuron circuit may perform a potentiating learning process on a preset number of input events among a plurality of previously stored input events in the reverse order to the order in which the input events are stored. When the number of previously stored input events is less than the preset number, the neuron circuit may perform the potentiating learning process on all of the previously stored input events.

A first probability being a synapse potentiating probability may be preset. For example, the first probability may be a constant, but is not limited thereto.

The neuron circuit may acquire a random constant and may determine whether to perform a synapse potentiating process by comparing the random constant and a potentiating learning reference constant determined based on the first probability. For example, when the random constant is less than a potentiating learning reference constant calculated by multiplying the upper limit of the random constant by the first probability, the neuron circuit may perform the synapse potentiating process. At this time, the random constant may be a positive number randomly selected from a certain range of positive numbers.

In another example, when the random constant is less than the potentiating learning reference constant, the neuron circuit may perform a synapse potentiating process.

In process 1140, the neuron circuit may perform a depressing learning process to set each of a plurality of synaptic weight values to an inactive value according to a second probability.

The neuron circuit may perform the depressing learning process to stochastically set the synaptic weight values to an inactive value. For example, the neuron circuit may stochastically determine whether to perform a synapse depressing process in which each of a plurality of synaptic weight values is set to an inactive value. At this time, the neuron circuit may independently determine whether to perform a synapse depressing process on each of a plurality of synaptic weight values.

The neuron circuit may perform the depressing learning process after performing the potentiating learning process. The neuron circuit may perform the depressing learning process on at least some of a plurality of synapses. For example, the neuron circuit may perform the depressing learning process on all of a plurality of synapses. In another example, the neuron circuit may perform the depressing learning process on some of a plurality of synapses on which the potentiating learning process is performed.

For example, the neuron circuit may stochastically determine whether to perform a synapse depressing process in which each of weight values of a plurality of synapses is set to an inactive value.

The second probability being a synapse depressing probability may be determined based on a plurality of synaptic weight values. For example, the second probability may be determined based on the number of active synapses having active synaptic weight values among a plurality of synapses. For example, the ratio of the difference between a preset proper number of active synapses and the number of active synapses to the number of active synapses may be set to the second probability.

The neuron circuit may acquire a random constant and may determine whether to perform a synapse depressing process by comparing the random constant and a depressing learning reference constant determined based on the second probability. For example, when the random constant is less than a depressing learning reference constant calculated by multiplying the upper limit of the random constant by the second probability, the neuron circuit may perform the synapse depressing process. That is, when the random constant is less than the depressing learning reference constant, the neuron circuit may set the weight value of a synapse to an inactive value.

In another example, when the random constant is greater than the depressing learning reference constant, the neuron circuit may perform a synapse depressing process.

When the input signal is determined as an active signal, the neuron circuit may compare a second cumulative reception counter of active input signals with a firing threshold value. In addition, when the second cumulative reception counter reaches the firing threshold value, the neuron circuit may output a spike signal. For example, the neuron circuit may send the spike signal to a post-synaptic neuron circuit.

When the neuron circuit determines that the second cumulative reception counter reaches the firing threshold value, the neuron circuit may reset the second cumulative reception counter.

For example, the firing threshold may be a fixed value. In another example, when the neuron circuit determines that the second cumulative reception counter reaches the firing threshold value, the neuron circuit may increase the firing threshold value. In addition, the firing threshold value may have an upper limit. When the firing threshold value is equal to the upper limit of the firing threshold value, the neuron circuit may maintain the firing threshold value at the upper limit.

Figure 12:
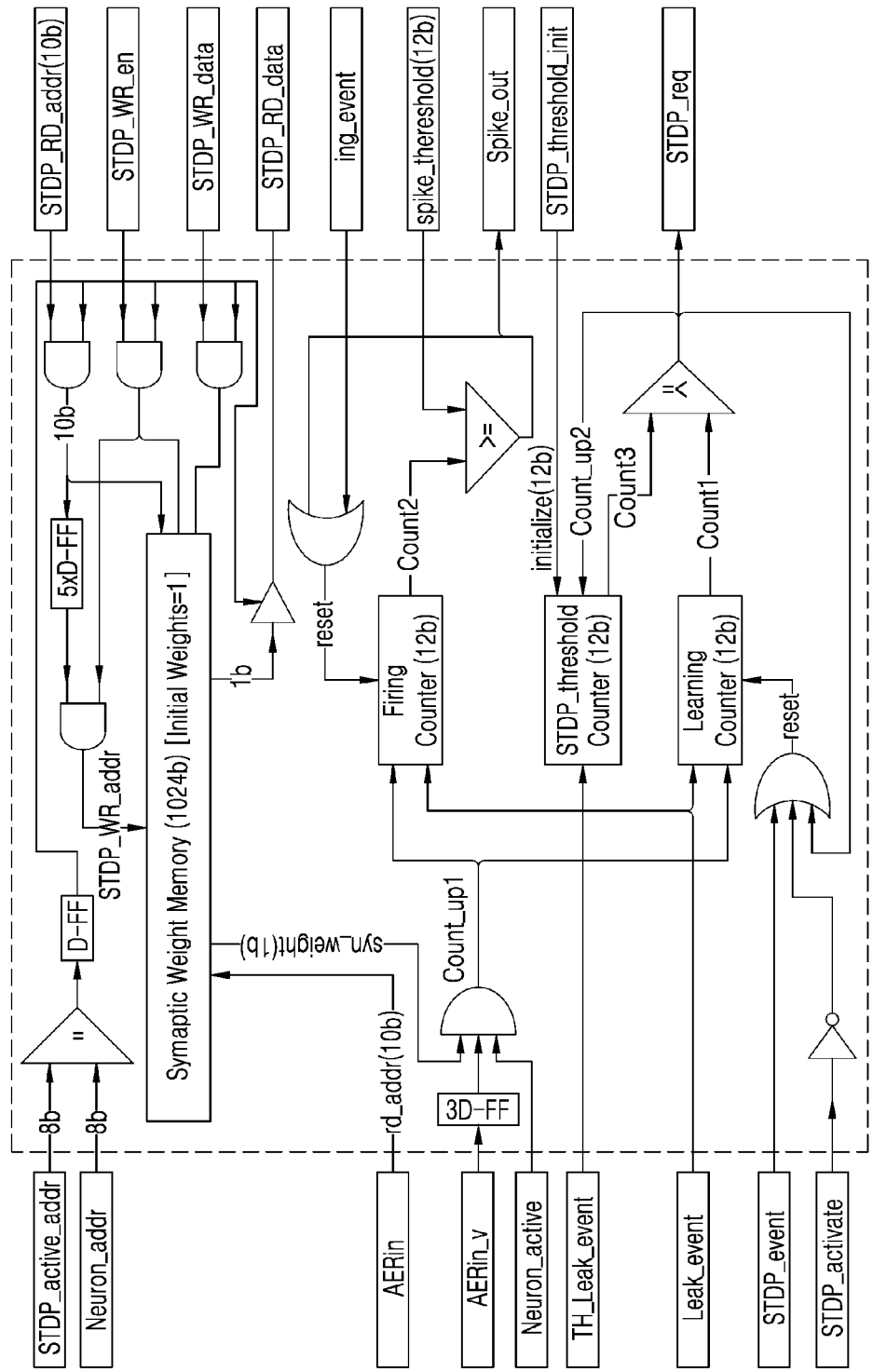
FIG. 12 is a view illustrating an example of a neuron block scheme for implementing a neuron circuit.

FIG. 12 is a view illustrating a neuron block scheme for implementing a neuron circuit.

The neuron block may have unique neuron address information. For example, a neuron address information signal Neuron_addr may include identification address information about each corresponding neuron block. When the value of an STDP active neuron address signal STDP_active_addr applied from the outside for information communication with the neuron block is equal to the value of the neuron address information signal Neuron_addr, a STDP learning process for the corresponding neuron block is activated.

The neuron block may receive an input signal AERin_v. AERin_v may refer to a spike signal applied from a pre-synaptic circuit.

In addition, the neuron block may receive an input signal AERin. The input signal AERin may include information about a synapse corresponding to the pre-synaptic circuit that has output the received input signal AErin_v. For example, AERin may refer to address information about an input terminal receiving a corresponding input signal among a plurality of input terminals applying input signals to the neuron block. Alternatively, AERin may refer to address information of a pre-synaptic circuit applying an input signal to the neuron block. Alternatively, the signal AERin may include address information of a synaptic weight memory cell that stores a corresponding synaptic weight value.

In addition, a neuron active signal Neuron_active may indicate that the neuron block is in a normal state capable of processing an input signal. For example, when the value of the neuron active signal Neuron_active is 0, although the neuron block receives an input from a pre-synaptic circuit, the value of a counting trigger signal Cout_up1 input to a firing counter and a learning counter does not toggle, and thus the value of the firing counter and the value of the learning counter may not increase.

When the value of the neuron active signal Neuron_active is 1, as an input signal AERin_v having an active value of 1, for example, is input, the output count value of the firing counter and the output count value of the learning counter may increase. For example, as the input signal AERin_v having an active value is input, the value of the counting trigger signal Count-up1 input to the firing counter and the learning counter may toggle to 1, and thus the output count value of the firing counter and the output count value of the learning counter may increase.

At this time, a synaptic weight value corresponding to the input signal AERin_v may be considered so that the value of the counting trigger signal Count-up1 may toggle to 1. For example, the neurons block may acquire a corresponding synaptic weight value syn_weight from a synaptic weight memory based on a synapse address signal rd_addr included in the signal AERin corresponding to the input signal AERin_v. The synapse address signal rd_addr may be used to acquire the synaptic weight value syn_weight used in the neuron block for processing the input signal AERin_v, and may be different from an STDP request synapse address signal STDP_RD_addr used for information communication with an STDP learning block (described later).

Only when the synaptic weight value syn_weight acquired according to the input signals AERin_v and AERin_v is 1, the value of the counting trigger signal (first count trigger signal) Count_up1 may toggle to 1. This indicates that a synapse transmitting that input is active.

In addition, the neuron block includes a synaptic weight memory. For example, the synaptic weight memory has a capacity of 1024 bits, and thus may maximally store synaptic weight values corresponding to 1024 synapses. For example, the synaptic weight value stored in each of the synaptic weight memory cells may have either an active value or an inactive value. For example, the active value of the synaptic weight value is 1, and the inactive value of the synaptic weight value is 0. In this case, initial values of all synaptic weight values stored in the synaptic weight memory may be set to be 1.

The firing counter may receive a reset signal as an input signal for initializing the count value of the counting trigger signal Count-up1. The reset signal may have a value for resetting the count value of the firing counter when a spike signal Spike_out is output or a signal inh_event instructing initialization is received from the outside.

The count value count2 of the firing counter is used as a reference for determining firing of a neuron. For example, when the count value count2 of the firing counter reaches a preset firing threshold value spike_threshold, a neuron may fire. In this case, the firing threshold value spike_threshold may be a preset fixed value. In another example, the firing threshold value spike_threshold may increase each time the count value count2 of the firing counter reaches the firing threshold value spike_threshold. At this time, even when the firing threshold value spike_threshold increases, the firing threshold value spike_threshold may not have an upper limit or may have an upper limit.

For example, the count value count2 of the firing counter and the firing threshold value spike-threshold may be compared. When the count value count2 of the firing counter is greater than the firing threshold value spike-threshold, a spike signal Spike_out has a value of 1. The case in which the spike signal Spike_out has a value of 1 indicates that the neuron block outputs a spike signal. For example, the output spike signal Spike_out may be transmitted to an upper-layer neuron block. For example, in a hierarchical neuron system, a spike signal Spike_out output from the current neuron block is transmitted to an upper-layer neuron block for which the current neuron block is a pre-synaptic neuron, so as to be used for firing or learning of the upper-layer neuron block.

In addition, a neuron module may include a learning request module that requests an STDP learning module for learning. For example, the neurons block may include the learning counter configured to determine whether to request learning and a STDP_threshold counter. Since the firing counter and the learning counter used for firing or learning of the upper-layer neuron block are distinguished from each other, although the learning speed of the current neuron block is gradually reduced, the learning speed of the upper-layer neuron block may not be reduced.

Like the firing counter, the learning counter may increase a count value when the first count trigger signal Count_up1 toggles to 1.

When the count value count1 of the learning counter reaches a preset learning threshold value, the neuron block may output a learning request signal STDP_req to request learning. For example, the count value count3 of the STDP_threshold counter that outputs a learning threshold value described below may be compared with the count value count1 of the learning counter. As a result of the comparison, when the count value count1 of the learning counter is equal to or greater than the count value count3 of the STDP_threshold counter, a learning request STDP_req signal having a value of 1 may be output. For example, when STDP_req is 1, learning is requested.

The learning counter may receive a reset signal. For example, the value of the reset signal may be determined based on signals STDP_activate and STDP_event indicating whether STDP learning has been activated or performed and the signal STDP_req indicating whether the neuron block has requested STDP learning. For example, when the count value count1 of the learning counter reaches the count value count3 of the STDP_threshold counter, and the value of the signal STDP_req becomes 1, the learning counter is reset such that the count value count1 may be resent to an initial value, for example, 0.

The learning threshold value may be increased. For example, the learning threshold value may be the count value count3 output from the STDP_threshold counter.

The STDP_threshold counter may acquire an initialize signal as an input. For example, the initialize signal may be a preset initial learning threshold value STDP_threshold_init. As the STDP_threshold counter receives the initialize signal, the STDP_threshold counter may output the initial learning threshold value STDP_threshold_init as a count value.

In addition, the STDP_threshold counter may receive a second count trigger signal count_up2. The count value count3 of the STDP_threshold counter may increase as the second count trigger signal count_up2 toggles to 1.

The second count trigger signal count_up2 may be determined based on the learning request signal STDP_req which is a signal for requesting an STDP block for learning. As the learning request signal STDP_req is toggled to 1, the second count trigger signal Count_up2 having the same value as the learning request signal STDP_req signal is toggled to 1, and the count value count3 of the STDP_threshold counter may be increased.

The increase in the count value count3 of the STDP_threshold counter may mean that the learning speed of a corresponding neuron gradually decreases as learning proceeds. Owing to this, feature learning is not concentrated on a particular neuron, and competition between neurons is induced. In another example, the learning threshold value may be a preset fixed value. As described above, since the firing counter providing a reference for outputting a spike signal Spike_out used for learning of an upper-layer neuron block is separately implemented, the learning speed of the upper-layer neuron block is not directly affected by a decrease in the learning speed of the current neuron block occurring as the learning threshold value of the current neuron block increases.

In addition, the neuron block may perform a leak process.

A leak event signal Leak_event may be input to the firing counter and the learning counter. The leak event signal Leak_event is for implementing variations in the state of a neuron with time. For example, the count values count1 and count2 of the firing counter and the learning counter may be decreased every preset time according to the leak event signal Leak_event.

Similarly, as a threshold value leak event signal TH_Leak_event is input, the count value of the STDP_threshold counter may be decreased every preset time.

At this time, the decrease rate of the STDP_threshold counter affected by the threshold value leak event signal TH_Leak_event may be lower than the decrease rate of the count values of the firing counter and the learning counter affected by the leak event signal Leak_event.

As described above, signals STDP_active_addr, STDP_RD_addr, STDP_WR_en, and STDP_WR_data are input signals received from the STDP learning block.

For example, the input signals mentioned above may be used by the STDP learning block to access the synaptic weight memory of the neuron block for reading or varying weight values.

The STDP active neuron address signal STDP_active_addr is an input signal received from the STDP learning block and includes address information of STDP learning target neurons. When the value of the STDP active neuron address signal STDP_active_addr and the value of the neuron address information signal Neuron_addr including unique address information of a corresponding neuron block are compared and determined to be equal to each other, a precondition for the STDP learning block to access the synaptic weight memory of the neuron block may be satisfied.

In an example, the STDP learning block may access each of a plurality of weight values stored in the synaptic weight memory so as to perform a learning process. At this time, the STDP request synapse address signal STDP_RD_addr includes cell address information for the STDP learning block to access a particular cell for reading or varying a synaptic weight value stored in the particular cell. Synapse address information includes cell address information.

The synaptic weight memory may receive the STDP request synapse address signal STDP_RD_addr from the STDP learning block. When a write enable signal STDP_WR_en has an inactive value, for example, 0, the synaptic weight memory outputs, as STDP_RD_data, a synaptic weight value stored in a cell corresponding to the STDP request synapse address signal STDP_RD_addr. The output synaptic weight value is transmitted to the STDP learning block through an STDP read signal STDP_RD_data and is used for learning.

STDP_WR_addr input to the synaptic weight memory is a write synapse address signal determined based on the STDP request synapse address signal STDP_RD_addr. At this time, only when the STDP write enable signal STDP_WR_en received from the STDP learning block is 1, the write synapse address signal STDP_WR_addr has a valid address value for activating a write function of the synaptic weight memory.

When the write enable signal STDP_WR_en has an active value, a synaptic weight value stored in a cell corresponding to the write synapse address signal STDP_WR_addr is set (changed) to the value of an input STDP write signal STDP_WR_data.

Using the above-described read and write processes, the STDP learning block may access a learning target neuron block and may access a particular synaptic weight memory in the learning target neuron block for reading or setting a synaptic weight value.

Figure 13:
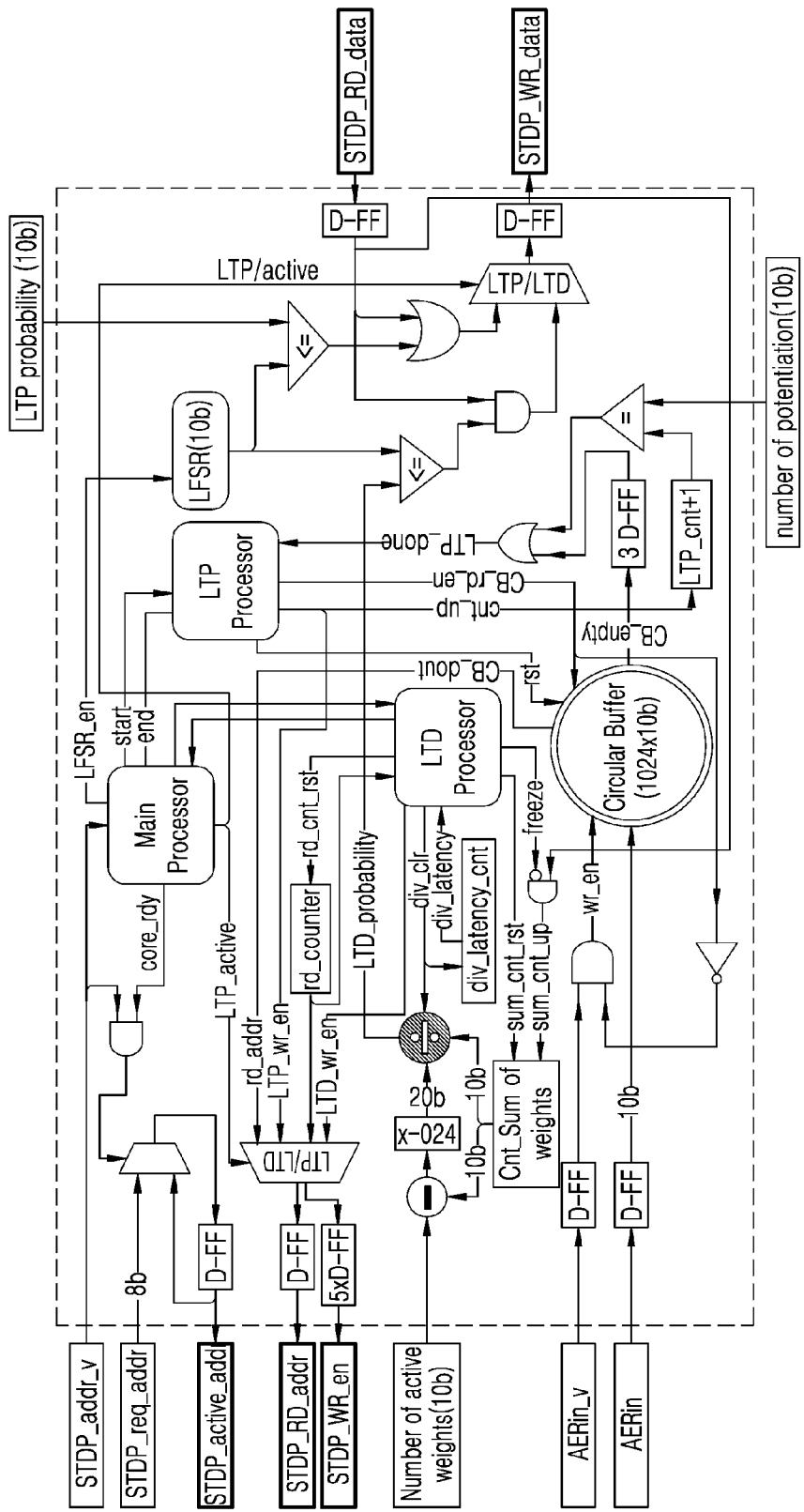
FIG. 13 is a view illustrating an example of an STDP learning block scheme for implementing a learning circuit.

FIG. 13 is a view illustrating an example of an STDP learning block scheme for implementing a learning circuit.

Referring to FIG. 13, the STDP learning block may include a circular buffer for storing input events.

In addition, the STDP learning block may include a potentiating learning processor (LTP processor) for performing long-term potentiation and a depressing learning processor (LTD processor) for performing depressing learning.

In addition, the STDP learning block may include a main processor configured to manage the start of a learning process in response to an STDP learning request, the start and end of potentiating learning, and the start and end of depressing learning.

As at least one neuron block of a plurality of neuron blocks transmits a learning request signal, the STDP learning block may receive a learning request reception signal STDP_addr_v having an active value. In addition, the STDP learning block may receive a learning request neuron address signal STDP_req_addr indicating the address of the neuron block requesting learning. For example, the learning request neuron address signal STDP_req_addr may be an 8-bit signal identifying up to 256 neuron blocks. That is, one STDP learning block may perform a learning process on 256 neuron blocks.

When the learning request reception signal STDP_addr_v has an active value, and a preparation completion signal core_rdy indicating completion of preparation for a learning process is received from the main processor as described below, a STDP active neuron address signal STDP_active_addr being an output signal for accessing a learning target neuron block and indicating address information of the learning target neuron block may have a value corresponding to the learning request neuron address signal STDP_req_addr.

Thereafter, the STDP learning block may access a neuron block corresponding to the STDP active neuron address signal STDP_active_addr, and may perform a learning process on the neuron block.

As the learning process starts, the main processor may apply a potentiating learning start signal (start) to the LTP processor. Thereafter, the LTP processor may perform potentiating learning, and after the potentiating learning, the LTP processor may apply a potentiating learning end signal (end) to the main processor.

After the main processor receives the potentiating learning end signal (end) from the LTP processor, the main processor may apply a depressing learning start signal (start) to the LTD processor in sequence. Then, the LTD processor may perform depressing learning, and after the depressing learning, the LTD processor may apply a depressing learning end signal (end) to the main processor.

As the main processor receives the depressing learning end signal, learning for the corresponding neuron block may be completed.

While the LTP processor performs the potentiating learning, output values relating to the potentiating learning but not relating to depressing learning may be selectively transmitted to the learning target neuron block by the main processor. For example, the main processor may output a potentiating learning active signal LTP_active having an active value to a multiplexer LTP/LTD configured to selectively output values relating to potentiating learning and values relating to depressing learning such that the multiplexer LTP/LTD may output values relating to potentiating learning. For example, when the potentiating learning active signal LTP_active has an active value, the multiplexer LTP/LTD outputs values relating to potentiating learning, and when the potentiating learning active signal LTP_active has an inactive value, the multiplexer LTP/LTD outputs values relating to depressing learning Upon receiving the potentiating learning start signal (start) from the main processor, the LTP processor starts potentiating learning.

The potentiating learning is performed based on event information data stored in the circular buffer. For example, pre-event information may indicate synapse address information corresponding to input signals applied to the learning target block, or may indicate input terminal address information.

Each time the circular buffer receives an input signal AERin_v applied to at least one neuron block including a learning target neuron, the circular buffer sequentially stores a signal AERin including corresponding synapse address information. The circular buffer may have a total capacity of 1024×10 bits. That is, the circular buffer may store 10-bits synapse address information corresponding to 1024 input signals that have recently occurred. At this time, the synapse address information may include addresses for identifying a plurality of input terminals through which input signals are transmitted to neuron blocks. Alternatively, the synapse address information may be address information of pre-synaptic neuron blocks that have transmitted spike signals as input signals. The address information of the input terminals or the address information of the pre-synaptic neuron blocks, and the address information of a target neuron block receiving the input signals may in combination represent the synapse address information. As an active value is received as the input signal AERin_v, a circular buffer write enable signal wr_en applied to the circular buffer may have an active value.

The LTP processor may set a synaptic weight value corresponding to recent synapse address information among synapse address information stored in the circular buffer to an active value based on a preset potentiating probability determination parameter (LTP probability).

At this time, the LTP processor may perform a potentiating learning process using a preset number of recent input events among input events corresponding to the synapse address information stored in the circular buffer. The preset number may be an input number of times of potentiating learning (number of potentiation). Each time the LTP processor performs a potentiating learning process based on each input event stored in the circular buffer, the LTP processor may apply a potentiating learning counting trigger signal cnt_up so as to increase the count value of a potentiating learning counter by 1 (LTP_cnt+1). When it is determined, as a result of the comparison, that the increased potentiating learning count value is equal to the number of times of potentiating learning (number of potentiation), the LTP processor may receive a potentiating learning end signal LTP_done having a value indicating completion. In addition, the potentiating learning end signal LTP_done may have the value indicating completion owing to a signal CB_empty output from the circular buffer and indicating that no pre-event is stored in the circular buffer. That is, the LTP processor terminates the potentiating learning process when the circular buffer is empty or the number of pre-events on which potentiating learning is performed reaches the number of times of potentiating learning (number of potentiation).

The LTP processor may apply a circular buffer read enable signal CB_rd_en to the circular buffer. Then, the circular buffer may output synapse address information corresponding to the current input event as a circular buffer output signal CB_dout. The circular buffer output signal CB_dout is an intermediate signal rd_addr output through the multiplexer LTP/LTD.

In addition, the LTP processor may output a potentiating learning write enable signal LTP_wr_en. Since the potentiating learning process is being performed, the intermediate signal rd_addr and the potentiating learning write enable signal LTP_wr_en may be output as output signals of the multiplexer LTP/LTD according to the potentiating learning active signal LTP_active. According to an output value of the multiplexer LTP/LTD, the STDP learning block may output an intermediate signal rd_addr as an STDP request synapse address signal STDP_RD_addr, and a potentiating learning write enable signal LTP_wr_en as a write enable signal STDP_WR_en.

Accordingly, a synaptic weight value stored in a cell of the synaptic weight memory corresponding to the STDP request synapse address signal STDP_RD_addr may be obtained from the learning target neuron block through the STDP read signal STDP_RD_data. During a read process, the LTP processor may output a write enable signal STDP_WR_en having an inactive value. In other words, during a read process, the LTP processor deactivates the write enable signal STDP_WR_en.

In addition, a random constant generated by a random constant generator may be compared with a preset potentiating probability determination parameter (LTP probability), and when the generated random constant is equal to or less than the potentiating probability determination parameter (LTP probability), a synaptic weight value may be potentiated. The expression "a synaptic weight is potentiated" means that a synaptic weight value corresponding to the STDP request synapse address signal STDP_RD_Addr is set to be 1. That is, the STDP learning block outputs 1 to the learning target neuron as an STDP write data signal STDP_WR_data. The value of the STDP write data signal STDP STDP_WR_data is transmitted to the learning target neuron block, and a synaptic weight value stored in a cell of the synaptic weight memory of the learning target neuron block is set to be 1. During the write process, the LTP processor may output 1 as a write enable signal LTP_wr_en. Accordingly, the STDP learning block may output 1 as the STDP write enable signal STDP_WR_en.

After potentiating learning, the LTD processor may perform a depressing learning process on the target neuron block.

The LTD processor may sequentially perform the depressing learning process on all the cells of the synaptic weight memory of the learning target neuron block that store synaptic weight values. Therefore, the LTD processor sequentially increases the output value of an rd_counter used for determining cell address values, so as to sequentially access the cells of the synaptic weight memory. Accordingly, according to the sequentially increasing output value of the rd_counter, the STDP request synapse address signal STDP_RD_addr is sequentially changed and output. Thus, the STDP learning block may individually access all the cells of the synaptic weight memory of the learning target neuron.

First, the STDP learning block may sequentially receive synaptic weight values stored in all the cells of the synaptic weight memory of the learning target neuron block, and may apply the received weight values to a summer increase signal sum_cnt_up. Therefore, the output value of a weight sum counter (Cnt_Sum of weight) may be the sum of all the synaptic weight values stored in the synaptic weight memory.

In addition, the STDP learning block may receive a predicted synaptic weight sum (Number of active) which has been previously determined. In addition, the STDP learning block may calculate a depressing probability determination parameter (LTD Probability) by calculating the difference between the predicted synaptic weight sum (Number of active) and the sum of all synaptic weight values, that is, the output value of the weight sum counter (Cnt_Sum of weight), multiplying the difference by 2^10, and dividing the multiplied difference by the sum of all synaptic weight values.

The LTD processor may perform a stochastic depressing learning process respectively on all the cells of the synaptic weight memory of the learning target neuron block using the calculated depressing probability determination parameter (LTD Probability).

The LTD processor may sequentially output address information corresponding to all the cells of the synaptic weight memory as STDP_RD_addr to obtain a synaptic weight value of a corresponding cell, and may stochastically change the synaptic weight value of the corresponding cell to 0 based on the depressing probability determination parameter (LTD Probability). For example, a random constant generated by the random constant generator is compared with the depressing probability determination parameter (LTD Probability). When the generated random constant is greater than the depressing probability determination parameter (LTD Probability), the weight value of the corresponding cell is changed to 0.

For example, when the generated random constant is greater than the depressing probability determination parameter (LTD Probability), 0 is applied to the STDP write data signal STDP_WR_data, and thus the weight value of the cell corresponding to the current STDP request synapse address signal STDP_RD_addr may be set to be 0. The above-described depressing learning process is performed on all the cells of the synaptic weight memory. However, random constants may be individually generated for the cells, and thus whether to perform the depressing learning process on the cells of the same synaptic weight memory may be differently determined.

Figure 14:
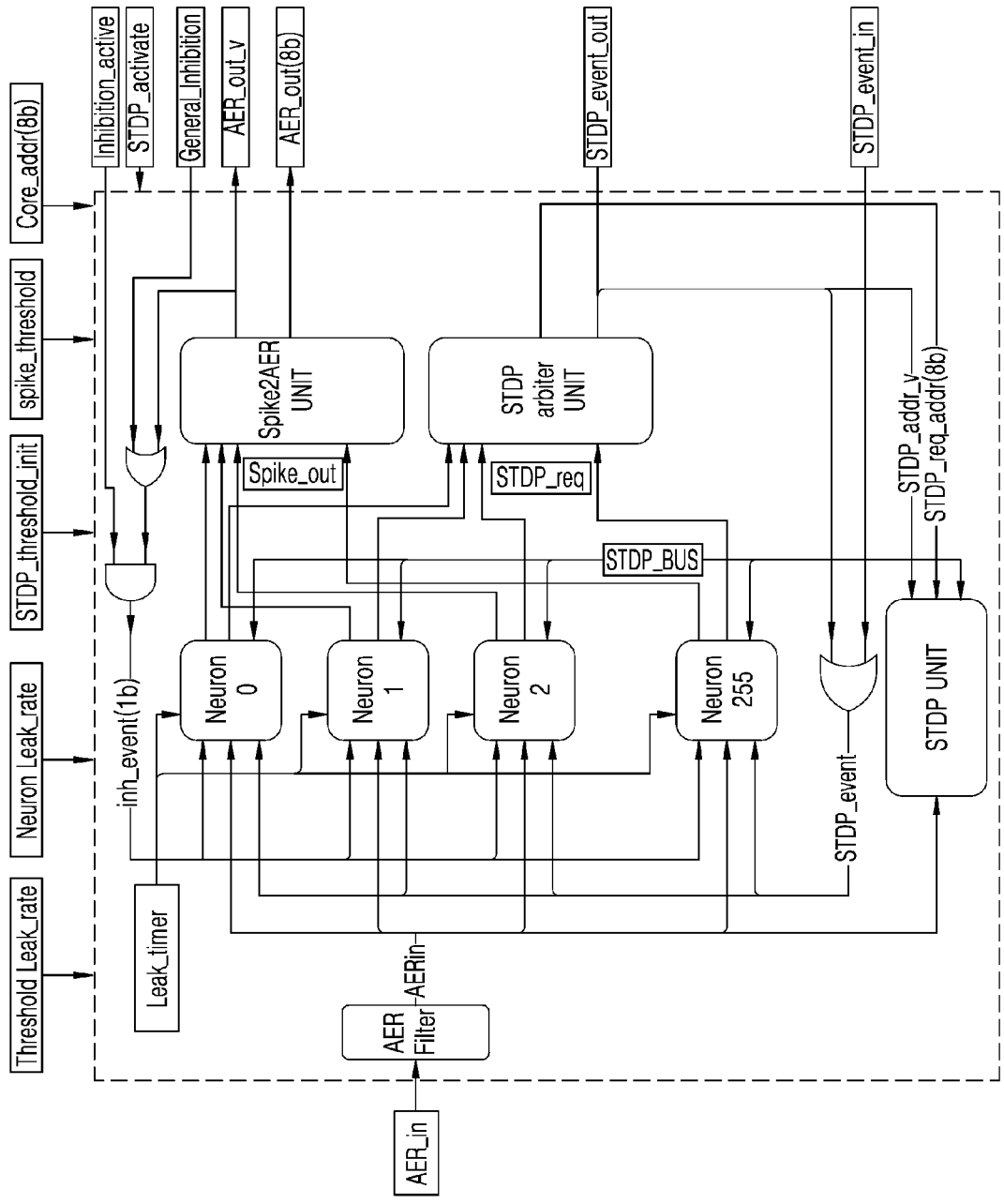
FIG. 14 is a view illustrating an example of a single-core block scheme for implementing a single-core circuit including a plurality of neuron circuits.

FIG. 14 is a view illustrating a single-core block scheme for implementing a single-core circuit including a plurality of neuron circuits.

Figure 15:
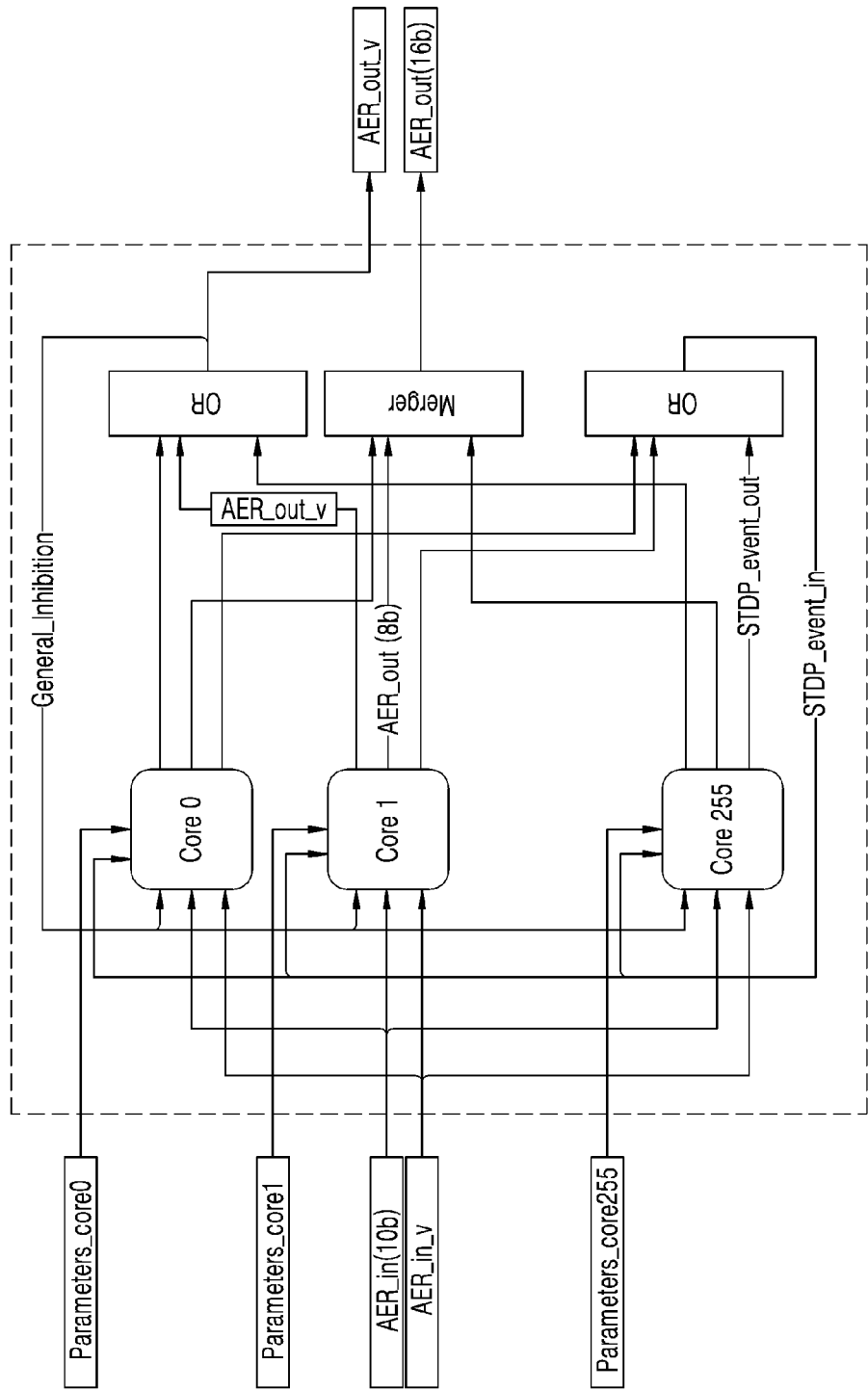
FIG. 15 is a view illustrating an example of a multi-core block including a plurality of single-core blocks.

FIG. 15 is a view illustrating a multi-core block including a plurality of single-core blocks.

A single-core block may include a plurality of neuron blocks Neuron 0, Neuron 1, Neuron 2, . . . , and Neuron 255 and a single STDP learning block. In FIG. 14, a single-core block includes 255 neuron blocks. However, the number of neuron blocks is not limited thereto.

The single-core block may receive a signal AER_in. The signal AER_in may be, for example, a signal received from a pre-synaptic neuron block of at least one neuron block of the single-core block. The signal AER_in may be, for example, a spike signal output from a pre-synaptic neuron block of at least one neuron block.

An AER filter may filter out signals not relating to the neuron blocks of the single-core block from the signal AERin. The AER filter may be implemented according to an artificial neural network architecture.

The filtered input signal AERin may be input to at least one neuron block of a plurality of neurons of the single-core block. For example, the signal AERin may be the same as the input signal 70 shown in FIG. 7, and the neuron blocks may be operated as described with reference to FIG. 12.

In the single-core circuit, the single STDP learning block performs a learning process on all of the plurality of neurons, and thus a method for preventing signal collision between the plurality of neurons is required.

Furthermore, in the single-core circuit, an input shared by the plurality of neurons may be input to a core circuit terminal as a common parameter.

For example, as illustrated in FIG. 12, a plurality of blocks may have a common occurrence rate of leak events. Thus, Threshold Leak_rate, which is a parameter specifying the leak rate at a STDP threshold counter, and Neuron Leak_rate, which is a parameter specifying the leak rate at a firing counter and a learning counter, may be input through a core terminal as common parameters. In addition, since a leak event needs to be implemented at a slower rate than other processes, the core circuit may include a Leak_timer which is a separate timer for determining whether to perform a leak event.

STDP_threshold_init indicating an initial threshold value of the STDP threshold counter, and spike_threshold indicating a firing threshold value may also be input to the core circuit as common parameters.

In addition, Inhibition_active indicating whether to activate an inhibiting mechanism may be input as a common parameter. When Inhibition_active is 1, the inhibiting mechanism is activated. When at least one of a plurality of neuron blocks of the same core outputs a spike signal, an inhibiting mechanism signal inh_event having a value of 1 may be input to a plurality of neurons, and thus all firing counters of the plurality of neurons may be reset.

In addition, referring to FIG. 15, a general inhibition parameter General_inhibiton may be used to apply the inhibiting mechanism to all neurons included in one core of the multi-core block when a spike signal is output from at least one of a plurality of neurons included in other cores of the multi-core block.

In addition, signals that are required to be distinguished between a plurality of neurons are spike signals spike_out and learning request signals STDP_req output from the plurality of neurons.

Based on spike signals spike_out received from a plurality of neurons, a spike signal output conversion unit (Spike2AER Unit) may output an output AER_out (8 bit) identifying a neuron block that has output a spike signal spike_out. In addition, the Spike2AER Unit may output a signal AER_out_v indicating that at least one neuron block has output a spike signal spike_out.

In addition, based on learning request signals STDP_req received from a plurality of neurons, an STDP learning arbiter unit (STDP arbiter UNIT) may output a learning request neuron address signal STDP_req_addr identifying a neuron block that has output the learning request signal STDP_req. In addition, the Spike2AER Unit may output a signal STDP_event_out indicating that at least one neuron block has output a learning request signal STDP_req.

When at least one neuron block in a core block outputs a learning request signal STDP_req, 1 is input as a signal STDP_envent, and learning counters of all neuron blocks in the core block are reset. In addition, referring to FIG. 15, all neurons included in a core of the multi-core block may be reset when a learning request signal is output from at least one of a plurality of neurons included in other cores of the multi-core block.

In FIG. 15, the multi-core block includes a plurality of core blocks and receives common parameters Parameters_core0, Parameters_core1, . . . Parameters_core255 that are shared by the core blocks.

In addition, a merger receives 8-bit signals AER_out (8 b) output from the plurality of core blocks and outputs a 16-bit signal AER_out (16 b).

In addition, when at least one of neuron blocks included in at least one of the plurality of core blocks or at least one of neuron blocks of all the neuron blocks of the plurality of core blocks outputs a spike signal, a general inhibition parameter General_inhibiton having a value of 1 is output to request an inhibiting mechanism.

Similarly, when at least one of neuron blocks included in at least one of the plurality of core blocks or at least one of neuron blocks of all the neuron blocks of the plurality of core blocks outputs a learning request signal STDP_event_out, a signal STDP_event_in resetting a learning counter has a value of 1 and is input to the multiple cores.

As described above, according to the one or more of the above embodiments, since the neuron circuit performs stochastic potentiating learning and depressing leaning, a SNN may be implemented using binary synaptic weight values, and thus the capacity of memory for storing synaptic weight values may be reduced.

In addition, since a learning process and a firing process are separately performed in the neuron circuit, the speed of learning of an upper layer may not be decreased due to a decrease in the speed of learning of a lower layer. In addition, though examples are made above of learning or training, non-limiting examples also include implementation of the trained SNN for various inference operations, such as image, object, or speech recognition, verification, or classification of captured image, object, or speech information through sensors of the device example that includes such hardware neurons, synapses, and/or core examples that may thereby implement the trained SNN. Additional examples further exist for other objectives.

The neuron circuit 600, synaptic weight memory 610, first sub-circuit 620, second sub-circuit 630, third sub-circuit 640, neuron circuit 700, synaptic weight memory 710, first sub-circuit 720, second sub-circuit 730, third sub-circuit 740, fourth sub-circuit 750, learning counter 731, learning threshold counter 732, first comparator 733, random constant generator 741, potentiating learning processor 742, depressing learning processor 743, input event buffer 744, synapse weight learning system 800, neuron circuit 860, learning circuit 840, second sub-circuit 830, learning counter 831, learning threshold counter 832, first comparator 833, random constant generator 841, potentiating learning processor 842, depressing learning processor 843, and input event buffer 844 of FIG. 1-15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more hardware processing elements or devices, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neuron circuit performing synapse learning on a plurality of synaptic weight values, the neuron circuit comprising:
   a first sub-circuit configured to receive an input signal from a pre-synaptic neuron circuit and determine whether the received input signal is an active signal having an active synapse value;
   a second sub-circuit configured to compare a first cumulative reception counter of active input signals with a learning threshold value based on results of the determination, and transmit a learning request signal to a third sub-circuit when the first cumulative reception counter reaches the learning threshold value; and
   the third sub-circuit configured to, in response to receiving the learning request signal:
      perform a potentiating learning process based on a first probability value to set a synaptic weight value of at least one previously received input signal to an active value, and
      perform a depressing learning process based on a second probability value to set each of the plurality of synaptic weight values to an inactive value, including determining a difference between a preset number of active synapses and a number of active synapses having active synaptic weight values, determining a ratio of the difference to the number of active synapses having active synaptic weight values, and setting the ratio as the second probability value.

2. The neuron circuit of claim 1, further comprising:
   a fourth sub-circuit configured to compare a second cumulative reception counter of the active input signals with a firing threshold value based on the results of the determination,
   wherein upon the second cumulative reception counter reaching the firing threshold value, the fourth sub-circuit transmits a spike signal to a post-synaptic neuron circuit of the neuron circuit.

3. The neuron circuit of claim 1, further comprising a synaptic weight memory to store the plurality of synaptic weight values.

4. The neuron circuit of claim 3, wherein the third sub-circuit is configured to determine the second probability value based on a number of active synapses having active synaptic weight values in the synaptic weight memory as a result of the potentiating learning process.

5. The neuron circuit of claim 1, wherein the second sub-circuit comprises a learning counter configured to count the first cumulative reception counter, the learning counter being reset upon the first cumulative reception counter reaching the learning threshold value.

6. The neuron circuit of claim 5, wherein the second sub-circuit further comprises a learning threshold counter configured to count the learning threshold value, the learning threshold value being increased upon the first cumulative reception counter reaching the learning threshold value.

7. The neuron circuit of claim 2, wherein the fourth sub-circuit comprises a firing counter configured to count the second cumulative reception counter, the firing counter being reset upon the second cumulative reception counter reaching the firing threshold value.

8. The neuron circuit of claim 4, wherein the third sub-circuit comprises a random constant generator, and
   upon a positive random constant acquired from the random constant generator being equal to or less than a potentiating learning reference constant calculated by multiplying an upper limit of the positive random constant by the first probability value, the third sub-circuit performs the potentiating learning process.

9. The neuron circuit of claim 8, wherein when the positive random constant acquired from the random constant generator is equal to or greater than a depressing leaning reference constant calculated by multiplying the upper limit of the positive random constant by the second probability value, the third sub-circuit performs the depressing leaning process on each of the plurality of synaptic weight values in the synaptic weight memory.

10. The neuron circuit of claim 1, wherein the third sub-circuit comprises an input event buffer storing synapse information contained in received input signals, and
    the third sub-circuit is configured to perform the potentiating learning process on synaptic weight values respectively corresponding to a preset number of pieces of the synapse information stored in the input event buffer in a reverse order to an order in which the pieces of synapse information are stored.

11. A learning system for a plurality of synaptic weight values, the learning system comprising:
    a learning circuit; and
    a neuron circuit configured to receive an input signal from a pre-synaptic neuron circuit and determine whether the received input signal is an active signal having an active synapse value, and upon a first cumulative reception counter of active input signals reaching a learning threshold value, the neuron circuit transmitting a learning request signal to the learning circuit,
    wherein as the learning circuit receives the learning request signal, the learning circuit performs a potentiating learning process based on a first probability value to set a synaptic weight value of at least one input signal previously received by the neuron circuit to an active value, and
    the learning circuit performs a depressing learning process based on a second probability value to set each of the plurality of synaptic weight values to an inactive value, including determining a difference between a preset number of active synapses and a number of active synapses having active synaptic weight values, determining a ratio of the difference to the number of active synapses having active synaptic weight values, and setting the ratio as the second probability value.

12. A learning method in a neuron circuit to learn a plurality of synaptic weight values between the neuron circuit and a pre-synaptic neuron circuit, the learning method comprising:
- as an input signal is received from the pre-synaptic neuron circuit, determining whether the received input signal is an active signal having an active synapse value;
- comparing a first cumulative reception counter of active input signals with a learning threshold value based on results of the determination;
- transmitting a learning request signal to a learning circuit when the first cumulative reception counter reaches the learning threshold value;
- when as the learning circuit receives the learning request signal, performing, by the learning circuit, a potentiating learning process based on a first probability value to set a synaptic weight value of at least one previously received input signal to an active value; and
- performing, by the learning circuit, a depressing learning process based on a second probability value to set each of the plurality of synaptic weight values to an inactive value, including determining a difference between a preset number of active synapses and a number of active synapses having active synaptic weight values, determining a ratio of the difference to the number of active synapses having active synaptic weight values, and setting the ratio as the second probability value.

13. The learning method of claim 12, further comprising:
- comparing a second cumulative reception counter of active input signals with a firing threshold value based on results of the determination; and
- when the second cumulative reception counter reaches the firing threshold value, transmitting a spike signal to a post-synaptic neuron circuit of the neuron circuit.

14. The learning method of claim 12, wherein the depressing learning process comprises determining a number of active synapses having active synaptic weight values among a plurality of synapses as a result of the potentiating learning process, and determining the second probability value based on the determined number of active synapses.

15. The learning method of claim 12, further comprising:
- initializing the first cumulative reception counter when the first cumulative reception counter reaches the learning threshold value.

16. The learning method of claim 15, further comprising:
- increasing the learning threshold value when the first cumulative reception counter reaches the learning threshold value.

17. The learning method of claim 13, further comprising:
- initializing the second cumulative reception counter when the second cumulative reception counter reaches the firing threshold value.

18. The learning method of claim 12, wherein the potentiating learning process comprises acquiring a positive random constant and performing the potentiating learning process when the acquired random constant is equal to or less than a potentiating learning reference constant calculated by multiplying an upper limit of the random constant by the first probability value.

19. The learning method of claim 12, wherein the depressing learning process comprises acquiring a positive random constant for each of the plurality of synaptic weight values and performing the depressing learning process on each of the plurality of synaptic weight values when the acquired random constant is equal to or greater than a depressing learning reference constant calculated by multiplying an upper limit of the random constant by the second probability value.

20. The learning method of claim 12, further comprising storing synapse information contained in received input signals,
- wherein the potentiating learning process comprises performing a potentiating learning process on synaptic weight values respectively corresponding to a preset number of pieces of previously stored synapse information in a reverse order to an order in which the pieces of synapse information are stored.

21. A non-transitory computer-readable recording medium storing instructions, which when executed by one or more processing devices, cause the one or more processing devices to perform the learning method of claim 12.

* * * * *